(12) United States Patent
Okazato et al.

(10) Patent No.: US 9,692,917 B2
(45) Date of Patent: Jun. 27, 2017

(54) OPERATING INFORMATION STORING SYSTEM, OPERATING INFORMATION STORING METHOD, AND NON-TRANSITORY COMPUTER READABLE RECORDING MEDIUM STORING AN OPERATING INFORMATION STORING METHOD FOR STORING INFORMATION FROM VOLATILE MEMORY TO NON-VOLATILE MEMORY

(71) Applicants: Atsushi Okazato, Kanagawa (JP); Hirohisa Saitoh, Tokyo (JP); Mie Watanabe, Tokyo (JP); Shunsuke Watanabe, Tokyo (JP); Yuka Konno, Kanagawa (JP); Takashi Toriumi, Kanagawa (JP); Yasunori Tsukioka, Kanagawa (JP); Hiroyuki Sakuyama, Tokyo (JP); Tohru Sasaki, Kanagawa (JP); Katsumi Tanaka, Kanagawa (JP); Koichiro Maemura, Kanagawa (JP); Yukinori Ishii, Kanagawa (JP); Tomohiro Kuroyanagi, Tokyo (JP); Fumiyoshi Kittaka, Kanagawa (JP); Makoto Sasaki, Kanagawa (JP); Junki Aoki, Kanagawa (JP); Takuya Mori, Tokyo (JP)

(72) Inventors: Atsushi Okazato, Kanagawa (JP); Hirohisa Saitoh, Tokyo (JP); Mie Watanabe, Tokyo (JP); Shunsuke Watanabe, Tokyo (JP); Yuka Konno, Kanagawa (JP); Takashi Toriumi, Kanagawa (JP); Yasunori Tsukioka, Kanagawa (JP); Hiroyuki Sakuyama, Tokyo (JP); Tohru Sasaki, Kanagawa (JP); Katsumi Tanaka, Kanagawa (JP); Koichiro Maemura, Kanagawa (JP); Yukinori Ishii, Kanagawa (JP); Tomohiro Kuroyanagi, Tokyo (JP); Fumiyoshi Kittaka, Kanagawa (JP); Makoto Sasaki, Kanagawa (JP); Junki Aoki, Kanagawa (JP); Takuya Mori, Tokyo (JP)

(73) Assignee: Ricoh Company Ltd., Tokyo (JP)

( * ) Notice: Subject to any disclaimer, the term of this patent is extended or adjusted under 35 U.S.C. 154(b) by 0 days.

(21) Appl. No.: 15/070,614

(22) Filed: Mar. 15, 2016

(65) Prior Publication Data
US 2016/0277604 A1 Sep. 22, 2016

(30) Foreign Application Priority Data
Mar. 20, 2015 (JP) .................. 2015-057208

(51) Int. Cl.
H04N 1/00 (2006.01)
H04N 1/32 (2006.01)
H04N 1/21 (2006.01)

(52) U.S. Cl.
CPC ..... *H04N 1/00244* (2013.01); *H04N 1/00347* (2013.01); *H04N 1/21* (2013.01);
(Continued)

(58) Field of Classification Search
None
See application file for complete search history.

(56) References Cited

U.S. PATENT DOCUMENTS

2005/0057771 A1 3/2005 Ohishi et al.
2007/0177196 A1* 8/2007 Maeda ............... H04N 1/00
358/1.15

(Continued)

FOREIGN PATENT DOCUMENTS

| JP | 2002-215431 | 8/2002 |
|---|---|---|
| JP | 2005-063422 | 3/2005 |
| JP | 2012-178878 | 9/2012 |

*Primary Examiner* — Andrew H Lam
(74) *Attorney, Agent, or Firm* — Harness, Dickey & Pierce, P.L.C.

(57) ABSTRACT

An operating information storing system includes a master apparatus and multiple slave apparatuses. The master apparatus and each slave apparatus respectively include a first processor. The master apparatus includes a nonvolatile memory, the first processor that acquires operating information generated by each slave apparatus, stores the acquired operating information, and determines if at least one operating information indicates specific operating information, and a first transmitter. Each slave apparatus includes a volatile memory, a second processor to store generated (Continued)

operating information in the volatile memory sequentially, and a second transmitter that transfers the operating information stored in the volatile memory to the master apparatus. The second processor stores the specific operating information in the volatile memory until the second transmitter transfers the generated specific operating information to the master apparatus based on the request transferred by the first transmitter in the master apparatus if the specific operating information is generated.

20 Claims, 18 Drawing Sheets

(52) U.S. Cl.
CPC . *H04N 1/32523* (2013.01); *H04N 2201/0031* (2013.01); *H04N 2201/0032* (2013.01); *H04N 2201/0039* (2013.01); *H04N 2201/0094* (2013.01)

(56) References Cited

U.S. PATENT DOCUMENTS

| | | |
|---|---|---|
| 2008/0094667 A1 | 4/2008 | Kodaira |
| 2009/0094694 A1 | 4/2009 | Kodaira |
| 2012/0023451 A1 | 1/2012 | Kuroyanagi |
| 2013/0027736 A1 | 1/2013 | Kittaka |
| 2014/0160530 A1 | 6/2014 | Kittaka |
| 2014/0362407 A1 | 12/2014 | Sasaki et al. |
| 2015/0271353 A1 | 9/2015 | Nishimura et al. |
| 2015/0286445 A1 | 10/2015 | Kittaka |

* cited by examiner

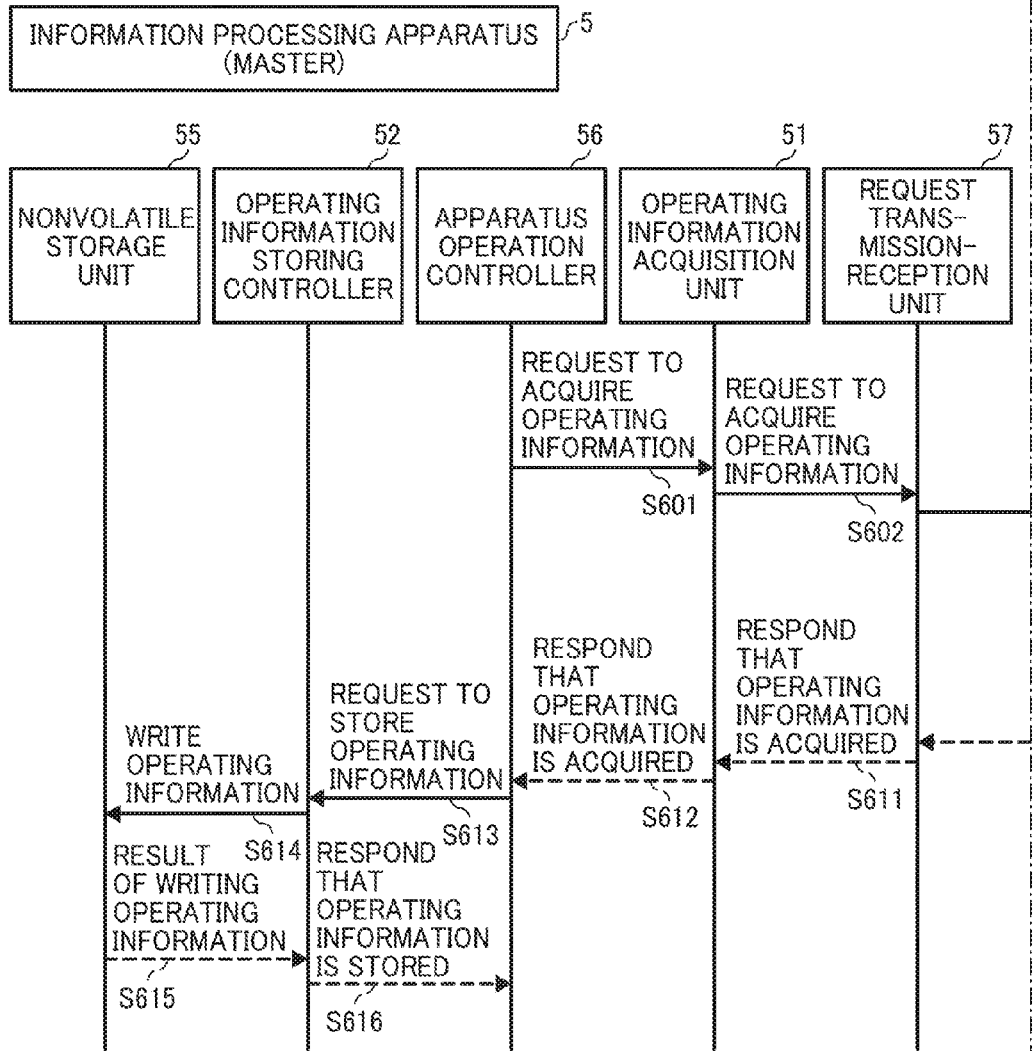

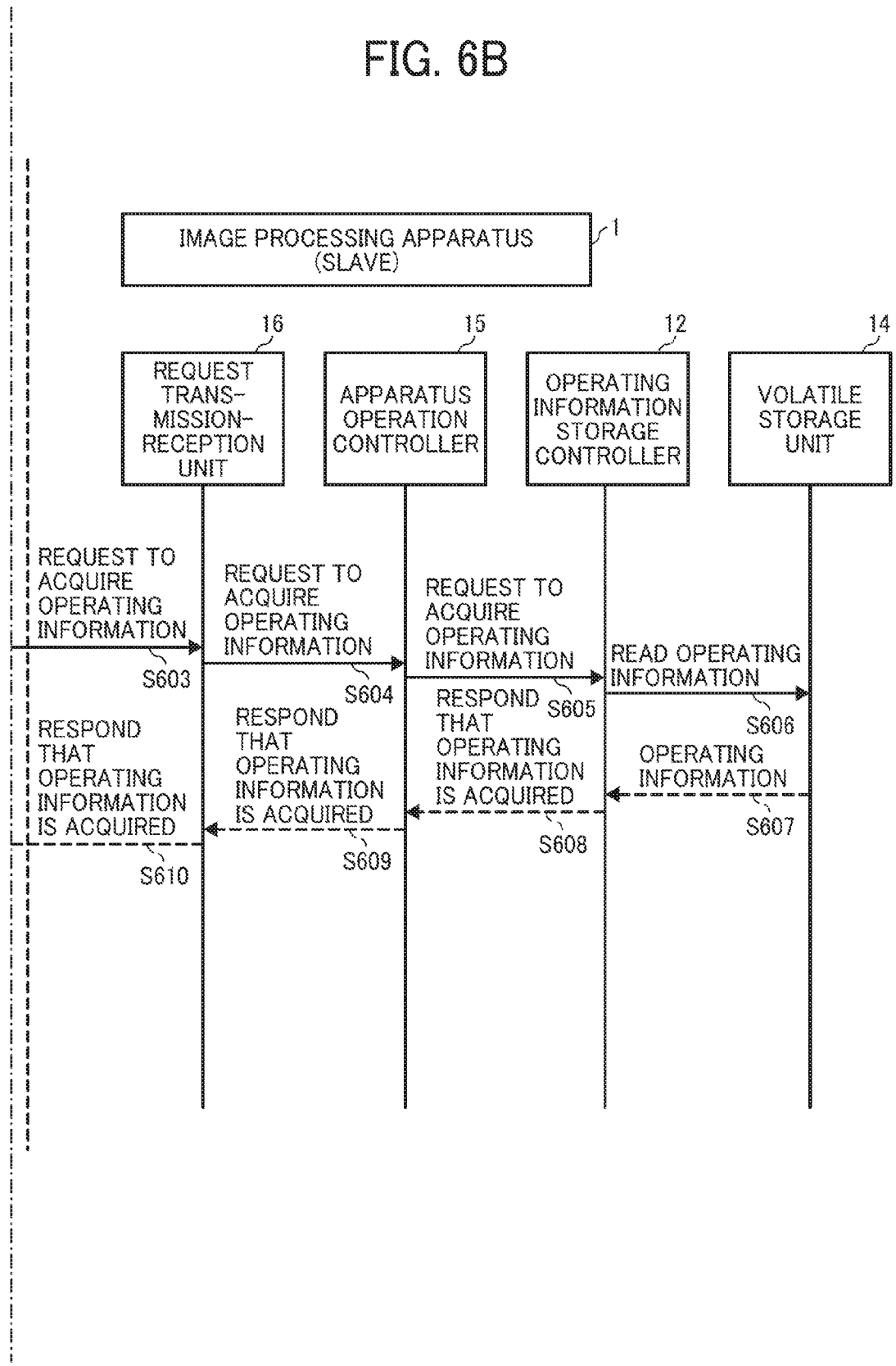

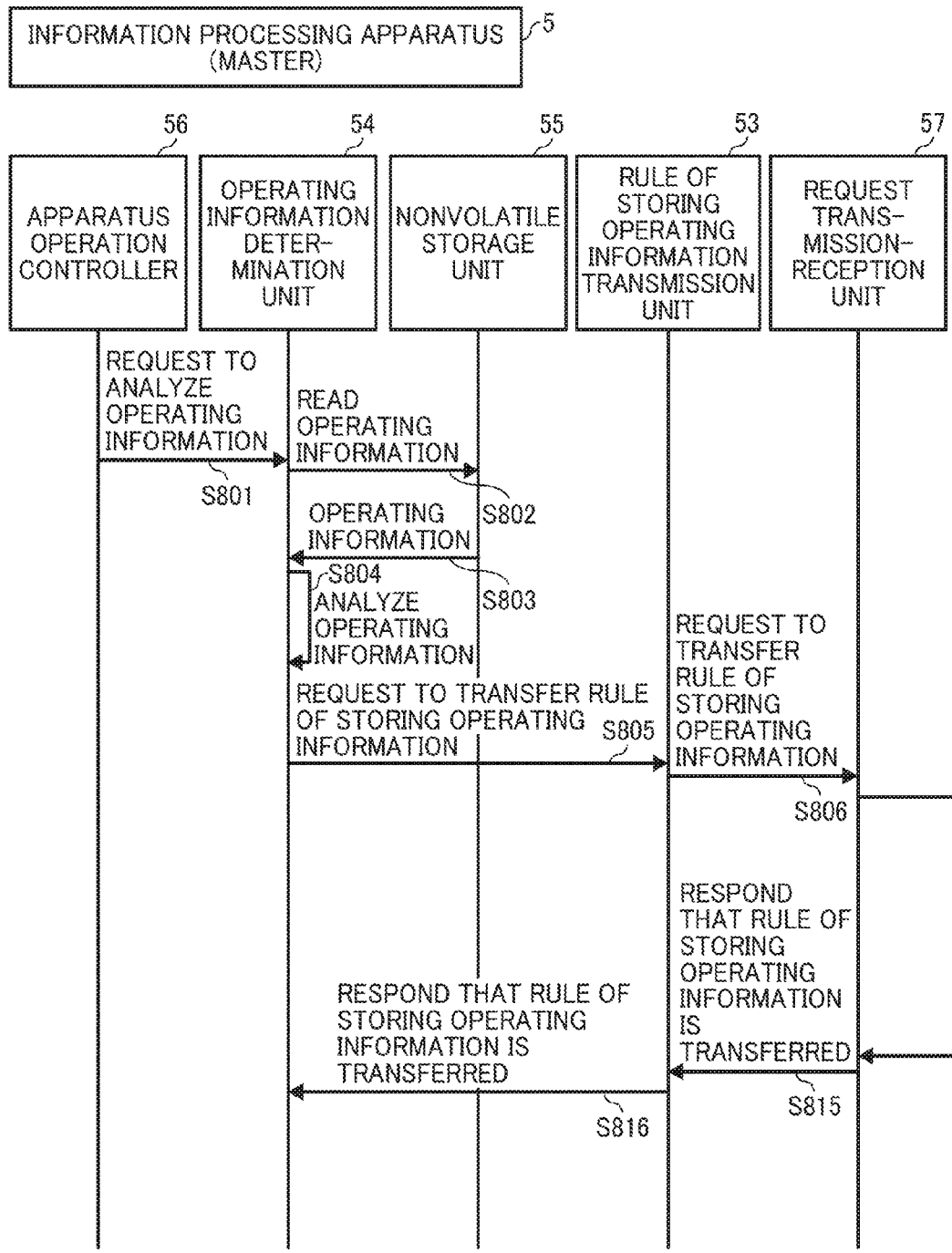

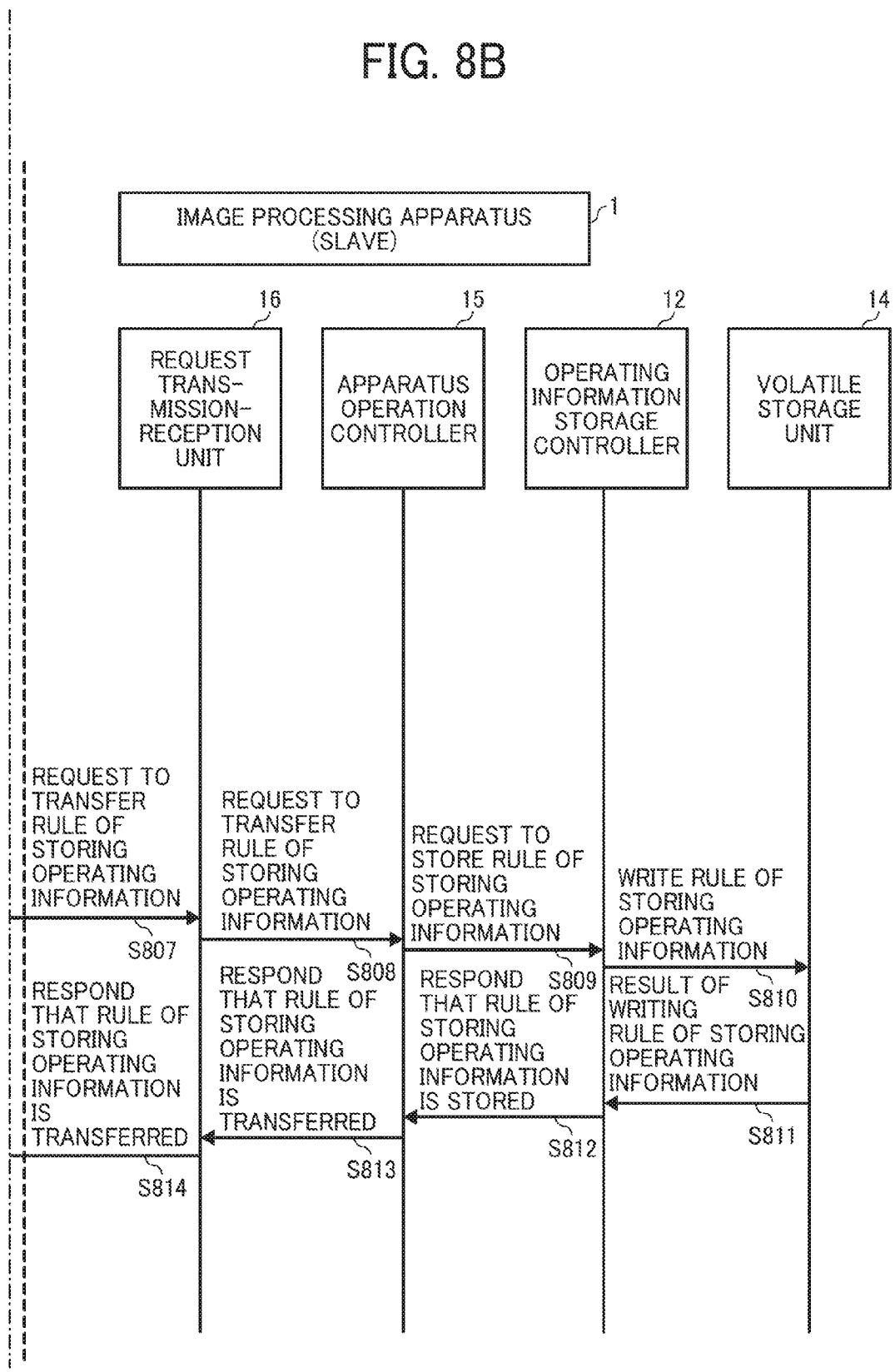

FIG. 10

| NO | TYPE OF SERVICE CALL | DESCRIPTION OF SERVICE CALL | PRIORITY | DATE/TIME WHEN PRIORITY IS UPDATED |
|---|---|---|---|---|
| 1 | SC899 | MALFUNCTION OF SOFTWARE | 5 | 2014/07/28 11:36:22 |
| 2 | SC672 | MALFUNCTION OF COMMUNICATION BETWEEN CONTROLLER AND CONTROL PANEL | 5 | 2014/05/03 09:23:55 |
| 3 | SC878 | MALFUNCTION OF TPM | 4 | 2014/06/17 20:42:38 |
| 4 | SC870 | ERROR OF DATA IN ADDRESS BOOK | 4 | 2014/02/27 15:09:21 |
| 5 | SC818 | KERNEL PANIC | 3 | 2014/01/11 18:27:36 |
| 6 | SC997 | APPLICATION FUNCTION CANNOT BE SELECTED | 3 | 2014/03/03 14:42:50 |
| 7 | SC865 | ERROR IN ACCESSING HDD | 2 | 2014/07/07 07:42:00 |
| ... | ........ | ........ | | |
| 999 | XXXX | XXXXX | 1 | ------- |

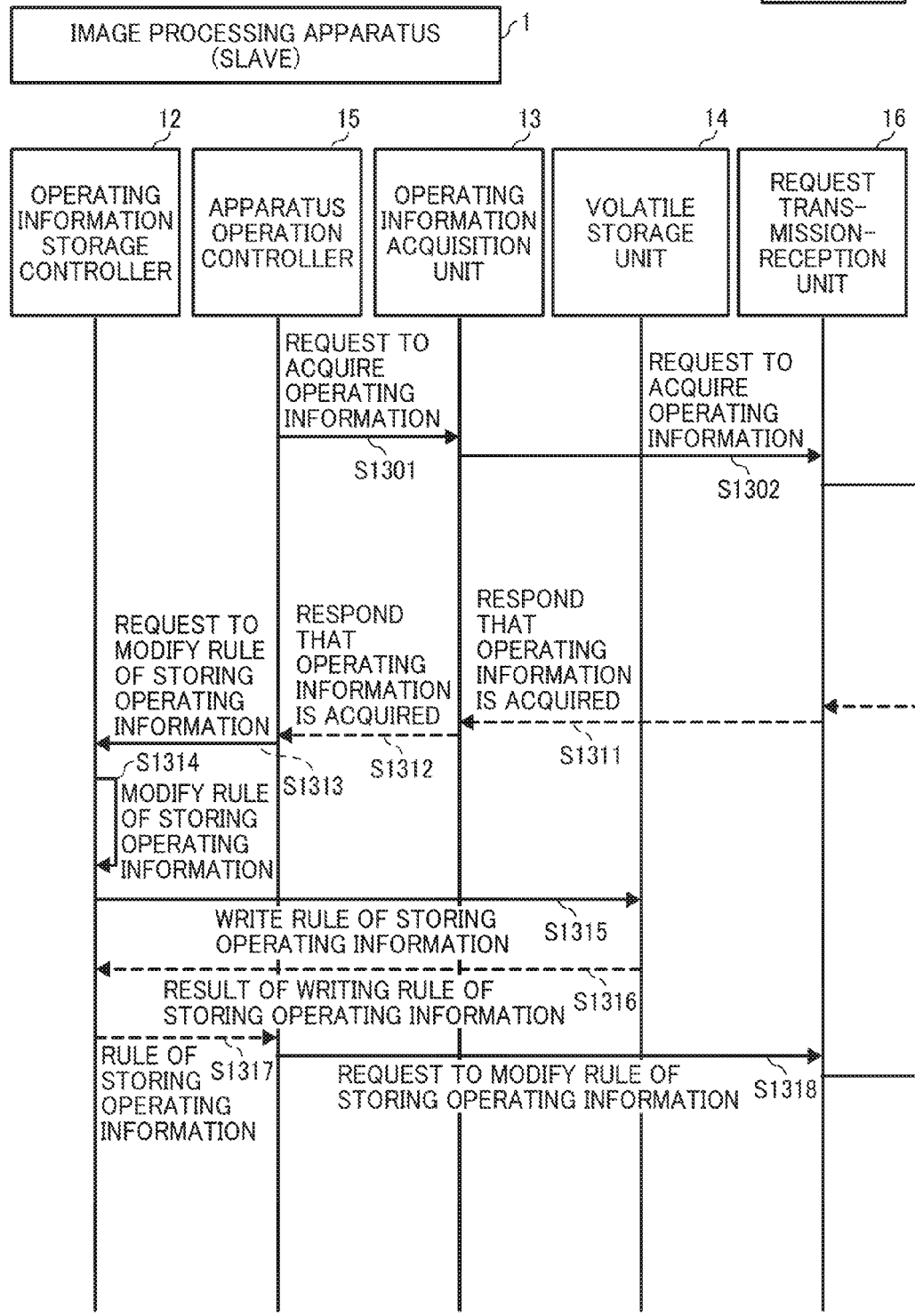

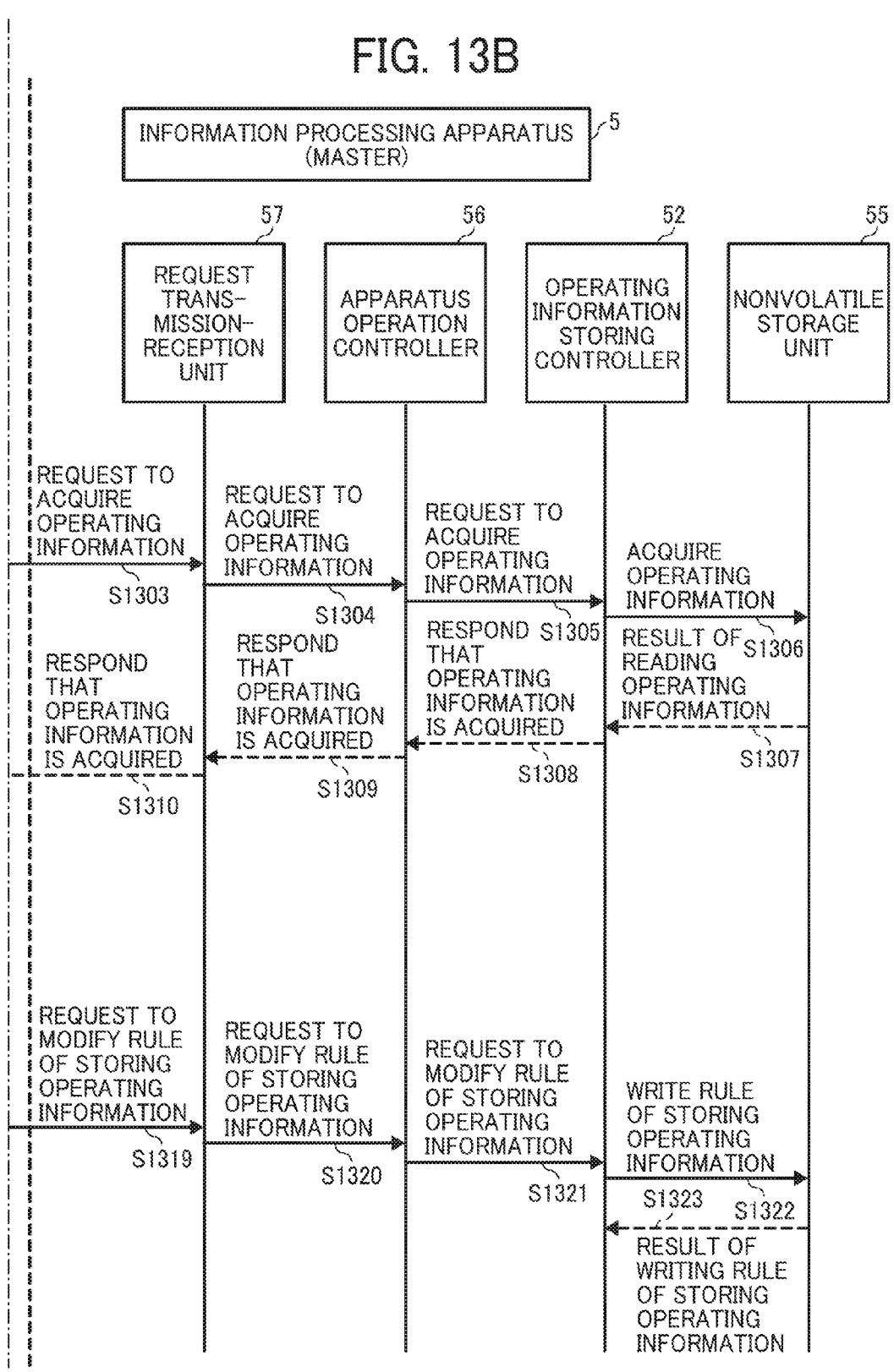

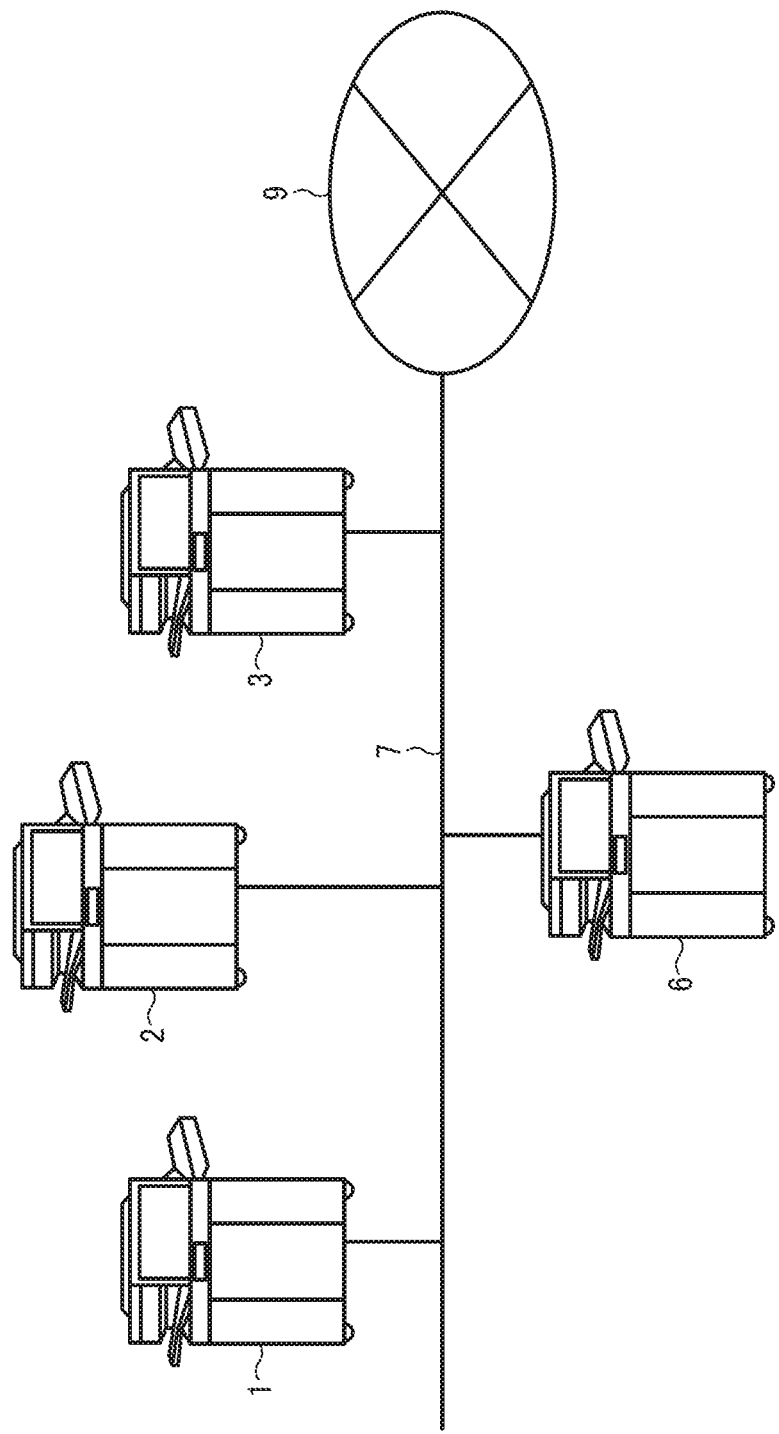

OPERATING INFORMATION STORING SYSTEM, OPERATING INFORMATION STORING METHOD, AND NON-TRANSITORY COMPUTER READABLE RECORDING MEDIUM STORING AN OPERATING INFORMATION STORING METHOD FOR STORING INFORMATION FROM VOLATILE MEMORY TO NON-VOLATILE MEMORY

CROSS-REFERENCE TO RELATED APPLICATIONS

This patent application is based on and claims priority pursuant to 35 U.S.C. §119(a) to Japanese Patent Application No. 2015-057208, filed on Mar. 20, 2015 in the Japan Patent Office, the entire disclosures of which are hereby incorporated by reference herein.

BACKGROUND

Technical Field

The present invention relates to an operating information storing system, an operating information storing method, and a non-transitory recording medium storing an operating information storing program.

Background Art

Recently, dangerousness of leak of information in office operations has been highly-publicized, and it is highly demanded to prevent information from leaking at offices.

Especially, image processing apparatuses such as digital multifunction peripherals (MFPs) used in office operations stores fairly lots of important information such as information on business clients and contents of transaction etc. that could cause trouble to business activities if the information leaks.

Therefore, in image processing apparatuses such as MFPs etc., it is general to store operating information on which information a user accesses and what information a user transfers to outsiders etc. in a storage device in the image processing apparatus as logs.

In addition, information processing systems that corporate IT administrators refer to logs stored in the image processing apparatuses and it is possible to check whether or not the image processing apparatuses are used appropriately and important information does not leak out from the image processing apparatuses etc. regularly are already known.

For example, an information processing apparatus that can store operating history information for a certain period of time used for analysis of failures in an external storage device surely without redundancy of a storage size and degradation of system performance to avoid inconvenience that operating history information output after failure overwrites operating history information at the time of failure is already known.

SUMMARY

An example embodiment of the present invention provides a novel operating information storing system, comprising a master apparatus and multiple slave apparatuses. The master apparatus and each of the multiple slave apparatuses respectively include a first processor that exchanges information between the master apparatus and the slave apparatus and controls operation of each apparatus. The master apparatus includes a nonvolatile memory, the first processor that acquires operating information generated by each of the multiple slave apparatuses in accordance with operation of each slave apparatus, stores the operating information acquired by the acquisition unit in the nonvolatile memory, and determines whether at least one operating information among the operating information acquired by the operating information acquisition unit indicates specific operating information, and a first information transmitter that transfers a rule of storing operating information to store the specific operating information to each of the multiple slave apparatuses if the first processor determines that the operating information indicates the specific operating information. Each of the multiple slave apparatuses includes a volatile memory, a second processor that stores operating information generated in accordance with operation of the slave apparatus itself in the volatile memory sequentially, and the second information transmitter to transfer the operating information stored in the volatile memory to the master apparatus. The second processor stores the specific operating information in the volatile memory until the second information transmitter transfers the generated specific operating information based on the request transferred by the first information transmitter in the master apparatus if the specific operating information is generated in accordance with the operation of the slave apparatus.

Further embodiments of the present invention provide an operating information storing method and a non-transitory recording medium storing an operating information storing program.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIGS. 6A and 6B are sequence charts illustrating an operation that the information processing apparatus 5 (master) acquires operating information of the image processing apparatus 1 (slave).

FIGS. 8A and 8B are sequence chart illustrating an operation that the information processing apparatus 5 (master) distributes a rule of storing operating information to the image processing apparatus 1 (slave).

FIG. 10 is a diagram illustrating a data configuration of the rule of storing operating information as an embodiment of the present invention.

FIGS. 13A and 13B are sequence charts illustrating an operation that the image processing apparatus 1 (slave) modifies the rule of storing operating information in the information processing apparatus 5 (master).

FIG. 16 is a diagram illustrating another system configuration similar to FIG. 1.

Figure 1:
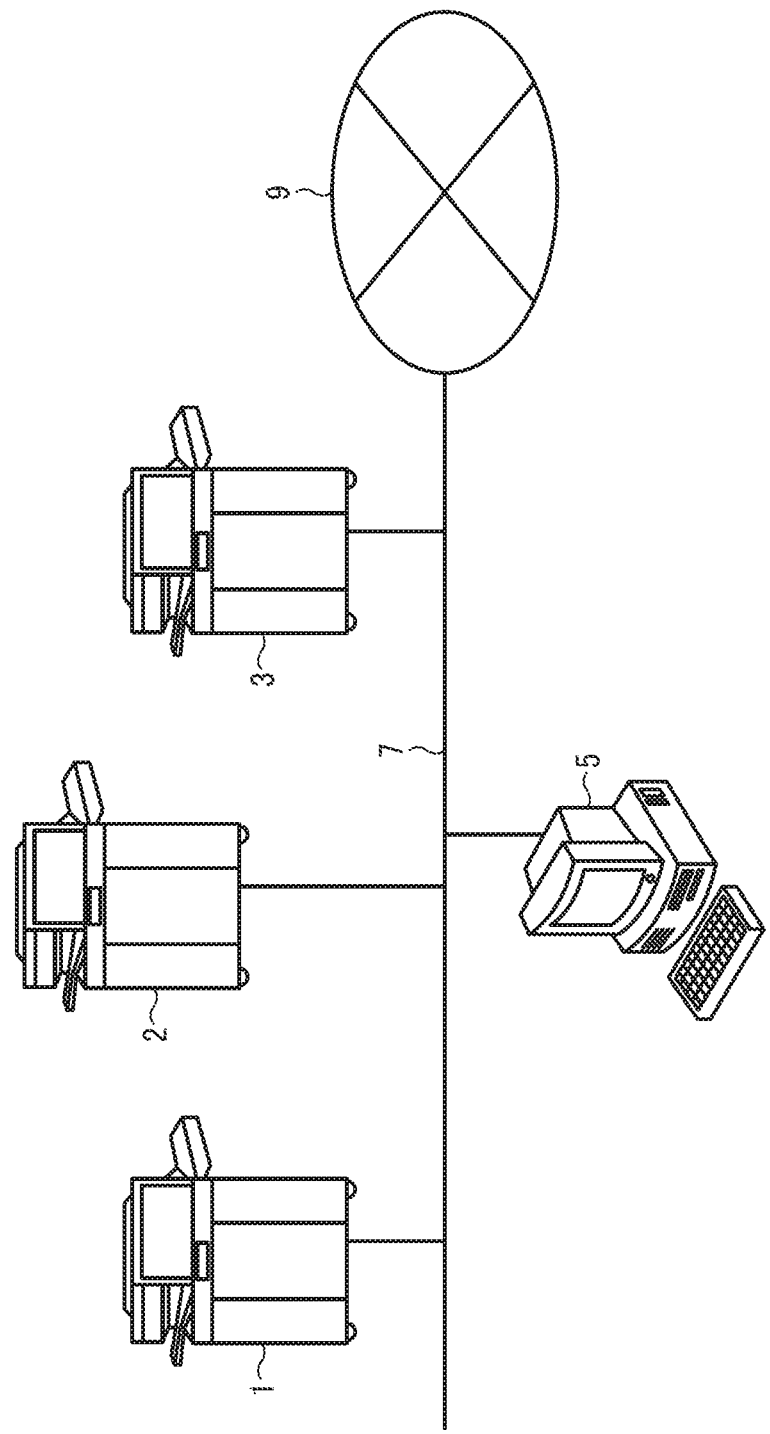
FIG. 1 is a diagram illustrating a system configuration as an embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing preferred embodiments illustrated in the drawings, specific terminology is employed for the sake of clarity. However, the disclosure of this patent specification is not intended to be limited to the specific terminology so selected, and it is to be understood that each specific element includes all technical equivalents that have the same function, operate in a similar manner, and achieve a similar result.

A more complete appreciation of the disclosure and many of the attendant advantages thereof will be readily obtained as the same becomes better understood by reference to the following detailed description when considered in conjunction with the accompanying drawings.

In the known technologies described above, in the conventional information processing apparatus and system, it is assumed that the information processing apparatus includes a nonvolatile storage device such as a hard disk drive (HDD) to store operating information of the information processing apparatus. Therefore, since the information processing apparatus that does not include the nonvolatile storage device due to reduction of cost etc. cannot store the operating information, it could be a problem that the operating information of the information processing apparatus cannot be stored and kept. Similar problem occurs in a system that includes an image processing apparatus that does not include the nonvolatile storage device.

In the embodiment described below, even in a system that includes the information processing apparatus that does not include the nonvolatile storage device and the image processing apparatus that does not include the nonvolatile storage device, the system that records and stores operating information of all information processing apparatuses and image processing apparatuses that construct the system appropriately is provided.

In the system of the present invention, the information processing apparatus and image processing apparatus that does not include the nonvolatile storage device and the information processing apparatus and image processing apparatus does includes the nonvolatile storage device are mixed in a network. Subsequently, the information processing apparatus and the image processing apparatus that includes the nonvolatile storage device acquires the operating information from the information processing apparatus and the image processing apparatus that does not include the nonvolatile storage device and stores it in their own nonvolatile storage device. As a result, it is possible to record and maintain the operating information of the information processing apparatus and image processing apparatus appropriately.

FIG. 1 is a diagram illustrating a system configuration in this embodiment.

In the system in FIG. 1, three image processing apparatuses 1 to 3 and one information processing apparatus 5 are connected with each other communicably via a local area network (LAN) 7. The LAN 7 is connected to an external network system 9 such as the Internet system etc. The system functions as an information processing system or an image processing system.

In FIG. 1, the image processing apparatuses 1 to 3 are MFPs. However, it is possible to use an image forming apparatus such as a copier, printer, facsimile machine etc. or an image scanning apparatus such as a scanner etc. The number of connected apparatuses is not limited to three. It is possible to use any multiple number of apparatuses equal to or more than two. In this embodiment, the image processing apparatuses 1 to 3 are slaves that do not include a nonvolatile storage device.

The information processing apparatus 5 is a master that includes a nonvolatile storage device such as a server. However, it is possible to use a personal computer (PC) or various information processing terminal apparatuses as the information processing apparatus 5. In addition, it is possible to share one of the image processing apparatuses as the information processing apparatus. In addition, it is possible to connect other information processing apparatuses to the network other than the information processing apparatus 5 used as the master.

The LAN 7 can be either wired or wireless. In addition, it is possible to use other communication networks as the LAN 7.

Figure 2:
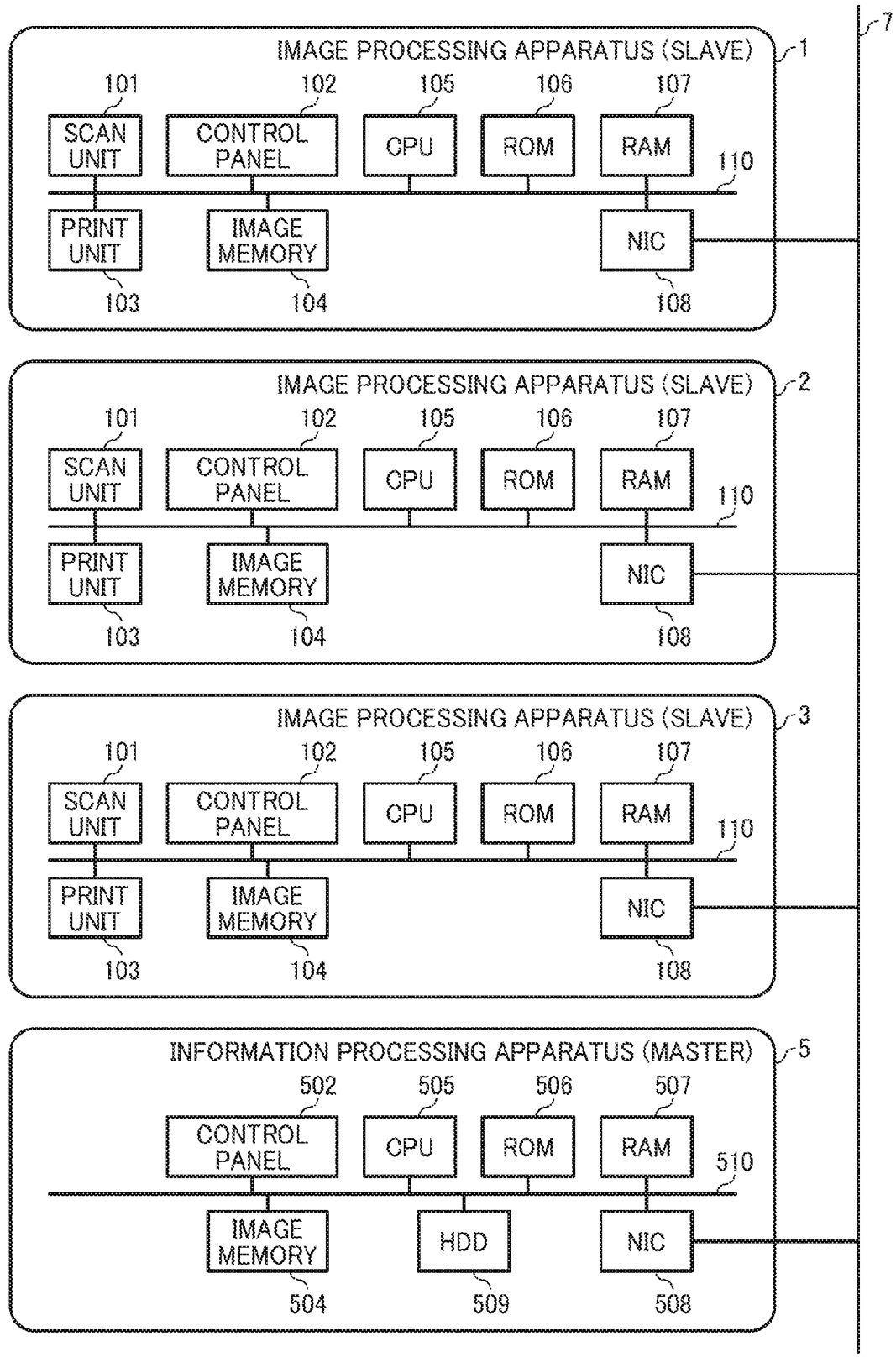
FIG. 2 is a block diagram illustrating a hardware configuration of image processing apparatuses 1 to 3 and an information processing apparatus 5 that construct the system in FIG. 1.

FIG. 2 is a block diagram illustrating a hardware configuration of the image processing apparatuses 1 to 3 and the information processing apparatus 5 that construct the system in FIG. 1.

The image processing apparatuses 1 to 3 in FIG. 2 are MFPs and include a same hardware configuration. That is, these image processing apparatuses 1 to 3 include a scan unit 101, a control panel 102, a print unit 103, an image memory 104, a CPU 105, a ROM 106, a RAM 107, and a network interface card (NIC) 108. Those units are connected with each other communicably exchanging signals and data via a system bus 110.

In the above configuration, the scan unit 101 scans an image on a document etc. and acquires its image data.

The control panel 102 is a user interface that includes operation units to accept user operation such as keys, buttons, and touch sensors and display units such as a display to present information to users.

The print unit 103 includes a function to form an image on paper based on the image data processed in the image processing apparatus.

The image memory 104 is a memory that temporarily stores image data scanned by the scan unit 101.

The CPU 105 controls the entire image forming apparatuses 1 to 3 respectively by executing a program stored in the ROM 106 or the HDD 108 using the RAM 107 as a work area, and various functions (described later) can be implemented.

The ROM 106 is a read only memory that stores a program and fixed data used for executing operations by the CPU 105.

The RAM 107 is a readable/writable volatile memory (volatile storage device) used as the work area of the CPU 105 and stores temporary data (including operating information).

The CPU 105, the ROM 106, and the RAM 107 construct a microcomputer.

The NIC 108 is a communication device that connects each of the image processing apparatuses 1 to 3 to the LAN 7 respectively.

The system bus 110 is a transmission line that connects those units described above communicably with each other exchanging signals and data.

These image processing apparatuses are known, and it is possible to include units other than hardware described above. However, these image processing apparatuses 1 to 3 are slaves and do not include the nonvolatile storage device that maintains stored data without supplying power such as a hard disk drive (HDD) etc.

In addition, it is possible that an image processing apparatus other than the image processing apparatuses 1 to 3 and other apparatuses are connected to the LAN 7.

On the other hand, the information processing apparatus 5 is the master and includes a control panel 502, an image memory 504, a CPU 505, a ROM 506, a RAM 507, a NIC 508, and a HDD 509. Those units are connected with each other communicably exchanging signals and data via a system bus 510. Those units described above other than the HDD 509 are the same as the control panel 102, the image memory 104, the CPU 105, the ROM 106, the RAM 107, the NIC 108, and the system bus 110 in the image processing apparatuses 1 to 3 described above.

The hardware configuration of the information processing apparatus 5 does not include the scan unit 101 and the print unit 103 in the hardware configuration of the image processing apparatuses 1 to 3 and includes the HDD 509 as the nonvolatile storage device that maintains stored data without supplying power. The hardware configuration of the information processing apparatus 5 is also similar to a hardware configuration of a generic PC.

Figure 3:
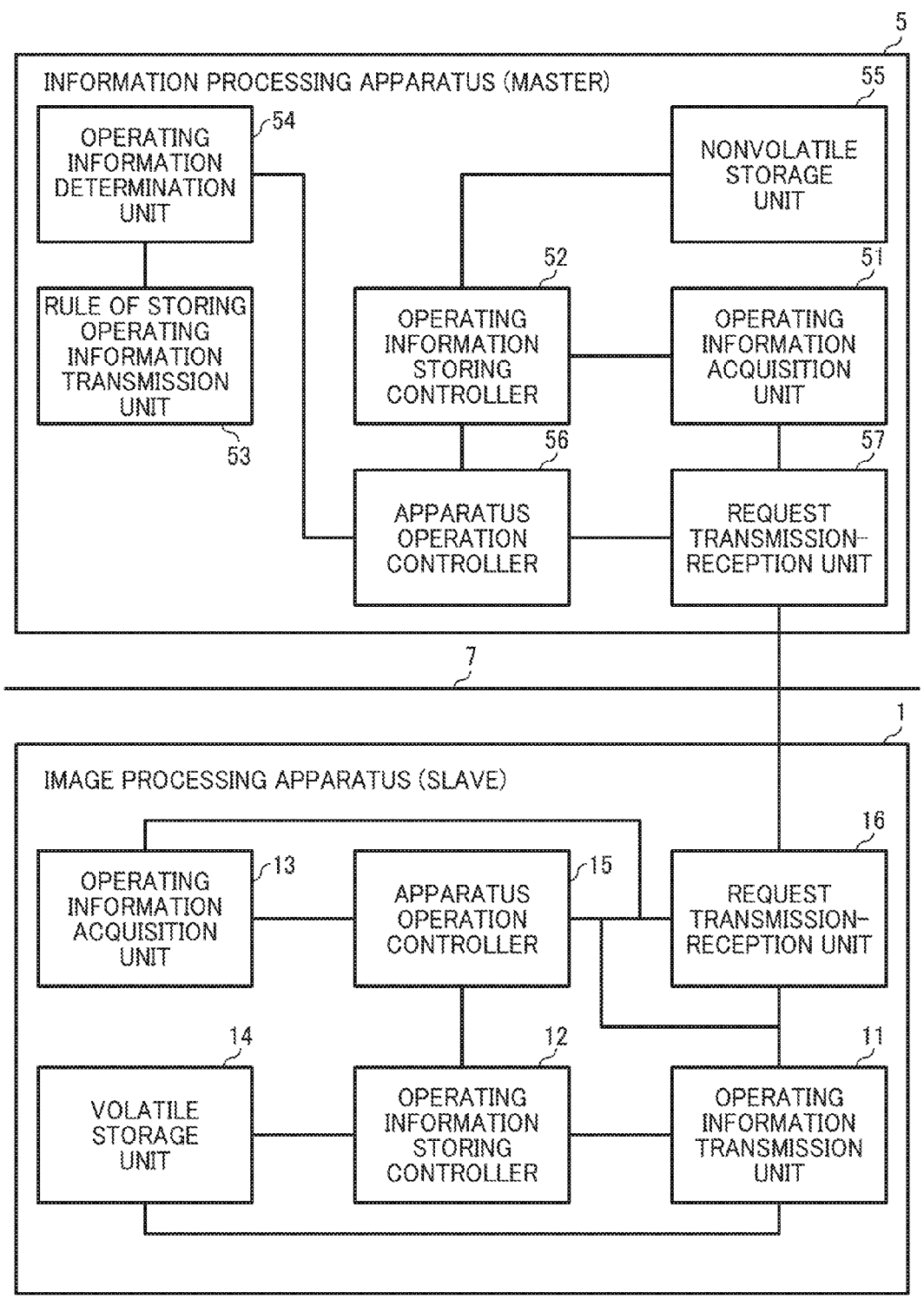
FIG. 3 is a block diagram illustrating a functional configuration of the information processing apparatus 5 as a master and the image processing apparatus 1 as a slave in the system in FIG. 2.

FIG. 3 is a block diagram illustrating a functional configuration of the information processing apparatus 5 as the master and the image processing apparatus 1 as the slave in the system in this embodiment.

As described above, in the system, the information processing apparatus 5 as the master is connected to the image processing apparatuses 1 to 3 via the LAN 7. Since the functional configuration of the image processing apparatuses 2 and 3 is the same as the functional configuration of the image processing apparatus 1, that is omitted in FIG. 3.

The information processing apparatus 5 as the master includes functional units such as an operating information acquisition unit 51, an operating information storing controller 52, a rule of storing operating information transmission unit 53, an operating information determination unit 54, a nonvolatile storage unit 55, an apparatus operation controller 56, and a request transmission-reception unit 57.

The operating information acquisition unit 51 acquires operating information stored in the image processing apparatuses 1 to 3 as the slaves. This function can be implemented by the NIC 508 in the information processing apparatus 5 in FIG. 2.

The operating information storing controller 52 controls an operation of maintaining operating information of the information processing apparatus 5 as the master. This function can be implemented by the CPU 505 in the information processing apparatus 5 in FIG. 2.

The rule of storing operating information transmission unit 53 instructs the image processing apparatuses 1 to 3 as the slaves to maintain the operating information. This function can be implemented by the NIC 508 in the information processing apparatus 5 in FIG. 2.

The operating information determination unit 54 analyzes the operating information stored in the information processing apparatus 5 as the master and determines which operating information is to be maintained. This function can be implemented by the CPU 505 in the information processing apparatus 5 in FIG. 2.

The nonvolatile storage unit 55 stores the operating information of the information processing apparatus 5 as the master and the image processing apparatuses 1 to 3 as the slave. This function can be implemented by the HDD 509 in the information processing apparatus 5 in FIG. 2.

The apparatus operation controller 56 executes a job, requests to store the operating information, requests to acquire the operating information, requests to analyze the operating information, and requests to generate and delegate the rule of storing operating information (described later respectively).

The request transmission-reception unit 57 exchanges various requests and their responses with a request transmission-reception unit 16 in the image processing apparatus 1 as the slave.

The operating information acquisition unit 51 corresponds to an acquisition unit of the information processing apparatus 5 as the master in this embodiment, the operating information storing controller 52 corresponds to a first storing controller of the information processing apparatus 5, the operating information determination unit 54 corresponds to a determination unit of the information processing apparatus 5, and the request transmission-reception unit 57 corresponds to a first transmission unit of the information processing apparatus 5 respectively.

The image processing apparatus 1 as the slave includes an operating information transmission unit 11, an operating information storing controller 12, an operating information acquisition unit 13, a volatile storage unit 14, an apparatus operation controller 15, and a request transmission-reception unit 16.

The operating information transmission unit 11 transfers the operating information stored in the image processing apparatus 1 as the slave to the information processing apparatus 5 as the master. This function can be implemented by the NIC 108 in the image processing apparatus 1 in FIG. 2.

The operating information storage storing controller 12 controls an operation of maintaining operating information of the image processing apparatus 1 as the slave. This function can be implemented by the CPU 105 in the image processing apparatus 1 in FIG. 2.

The operating information acquisition unit 13 acquires the operating information stored in the information processing apparatus 5 as the master. This function can be implemented by the NIC 108 in the image processing apparatus 1 in FIG. 2.

The volatile storage unit 14 stores the operating information of the image processing apparatus 1 as the slave temporarily. This function can be implemented by the RAM 107 in the image processing apparatus 1 in FIG. 2.

The apparatus operation controller 15 executes a job, requests to store the operating information, requests to acquire the operating information, requests to transfer the operating information, requests to store the rule of storing operating information, and generate the rule of storing operating information (described later respectively).

The request transmission-reception unit 16 exchanges various requests and their responses with a request transmission-reception unit 57 in the information processing apparatus 5 as the master.

The operating information storing controller 12 corresponds to a second storing controller of the image processing apparatuses 1 to 3 as the slave in this embodiment, and the request transmission-reception unit 16 corresponds to a second transmission unit of the image processing apparatuses 1 to 3 respectively.

Figure 4:
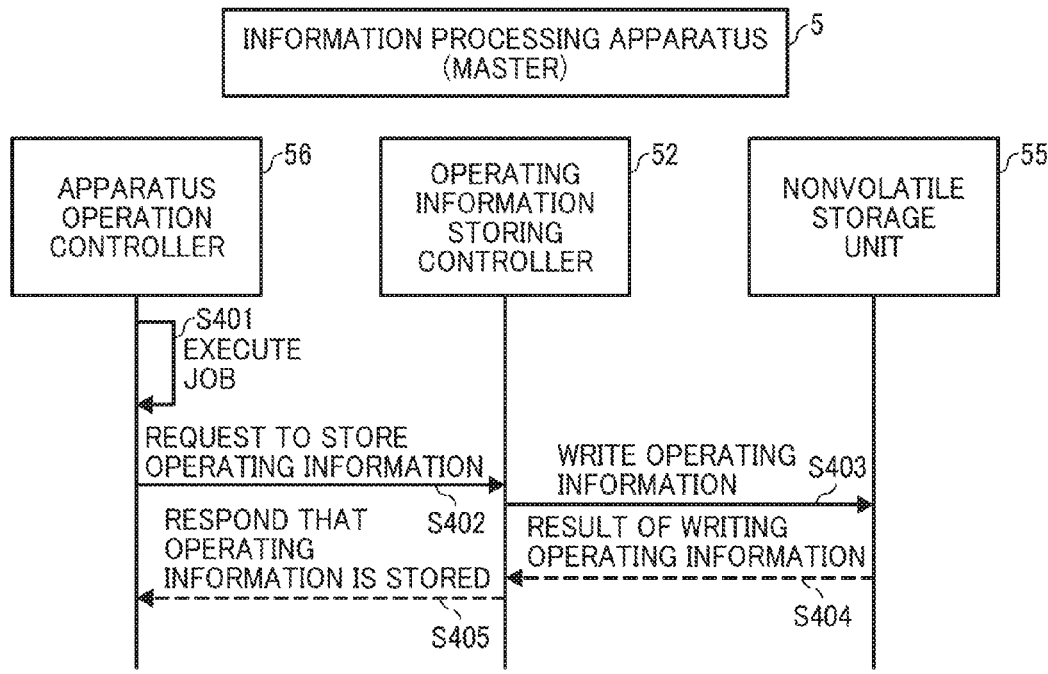
FIG. 4 is a sequence chart illustrating an operation that the information processing apparatus 5 (master) in FIG. 3 stores operating information.

FIG. 4 is a sequence chart illustrating an operation that the information processing apparatus 5 (master) in FIG. 3 stores operating information.

After the information processing apparatus 5 starts executing a job, the apparatus operation controller 56 executes the job and requests the operating information storing controller 52 to store the operating information.

Subsequently, the operating information storing controller 52 writes the operating information generated by executing the job by the apparatus operation controller 56 in the nonvolatile storage unit 55. After receiving a result of writing the operating information from the nonvolatile storage unit 55, the operating information storing controller 52 transfers a request to store the operating information to the apparatus operation controller 56.

Figure 5:
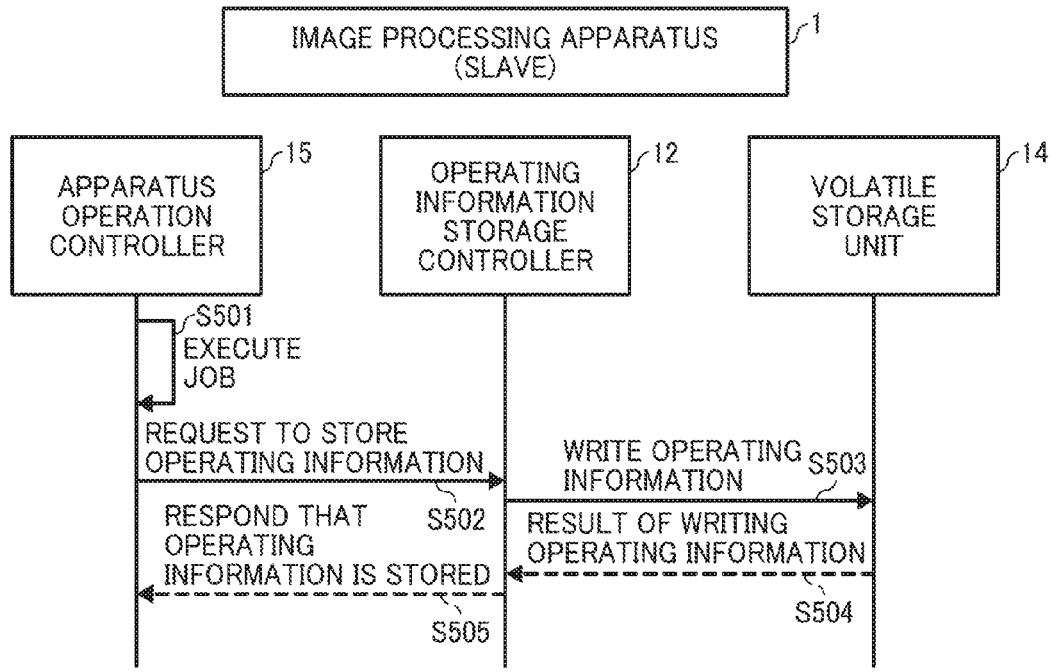
FIG. 5 is a sequence chart illustrating an operation that the image processing apparatus 1 (slave) in FIG. 3 stores operating information.

FIG. 5 is a sequence chart illustrating an operation that the image processing apparatus 1 (slave) in FIG. 3 stores the operating information. It should be noted that other image processing apparatuses 2 and 3 as the slaves work in the same way.

After the image processing apparatus 1 starts executing a job, the apparatus operation controller 15 executes the job and requests the operating information storing controller 12 to store the operating information.

Subsequently, the operating information storing controller 12 writes the operating information generated by executing the job by the apparatus operation controller 15 in the nonvolatile storage unit 14. After receiving a result of writing the operating information from the volatile storage unit 14, the operating information storing controller 12 transfers a request to store the operating information to the apparatus operation controller 15.

FIGS. 6A and 6B are sequence charts illustrating an operation that the information processing apparatus 5 (master) acquires the operating information of the image processing apparatus 1 (slave). In this case, the master acquires the operating information stored in the slave.

The apparatus operation controller 56 in the information processing apparatus 5 requests the operating information acquisition unit 51 to acquire the operating information. As a result, the operating information acquisition unit 51 requests the request transmission-reception unit 57 to acquire the operating information, and the request transmission-reception unit 57 requests the image processing apparatus 1 to acquire the operating information.

In the image processing apparatus 1, after receiving the request to acquire the operating information by the request transmission-reception unit 16, the request transmission-reception unit 16 requests the apparatus operation controller 15 to acquire the operating information. Subsequently, the apparatus operation controller 15 requests the operating information storing controller 12 to acquire the operating information. As a result, the operating information storing controller 12 reads the operating information from the volatile storage unit 14. The read operating information contained in a response of acquiring the operating information is transferred from the operating information storing controller 12 to the apparatus operation controller 15 and from the apparatus operation controller 15 to the request transmission-reception unit 16 sequentially. After that, the request transmission-reception unit 16 transfers the response of acquiring the operating information to the information processing apparatus 5.

In the information processing apparatus 5, after the request transmission-reception unit 57 receives the response of acquiring the operating information, the response of acquiring the operating information is transferred from the request transmission-reception unit 57 to the operating information acquisition unit 51, and the response of acquiring the operating information is transferred from the operating information acquisition unit 51 to the apparatus operation controller 56 sequentially. Subsequently, the apparatus operation controller 56 requests the operating information storing controller 52 to store the operating information.

Consequently, the operating information storing controller 52 writes the operating information in the nonvolatile storage unit 55. After finishing writing the operating information, the nonvolatile storage unit 55 transfers a result of writing the operating information to the operating information storing controller 52. After receiving the result of writing the operating information, the operating information storing controller 52 transfers a response of storing the operating information to the apparatus operation controller 56.

Regarding the acquisition of the operating information from the master to the slave, it is possible to acquire the operating information on regular basis or at specified date and time in accordance with a configuration of the master. Otherwise, it is possible that the slave stores the similar information and the acquiring operation is performed in accordance with a setting by exchanging information between the master and the slave.

The similar operation is performed between the information processing apparatus 5 (master) and the image processing apparatuses 2 and 3 (slaves) respectively.

Figure 7:
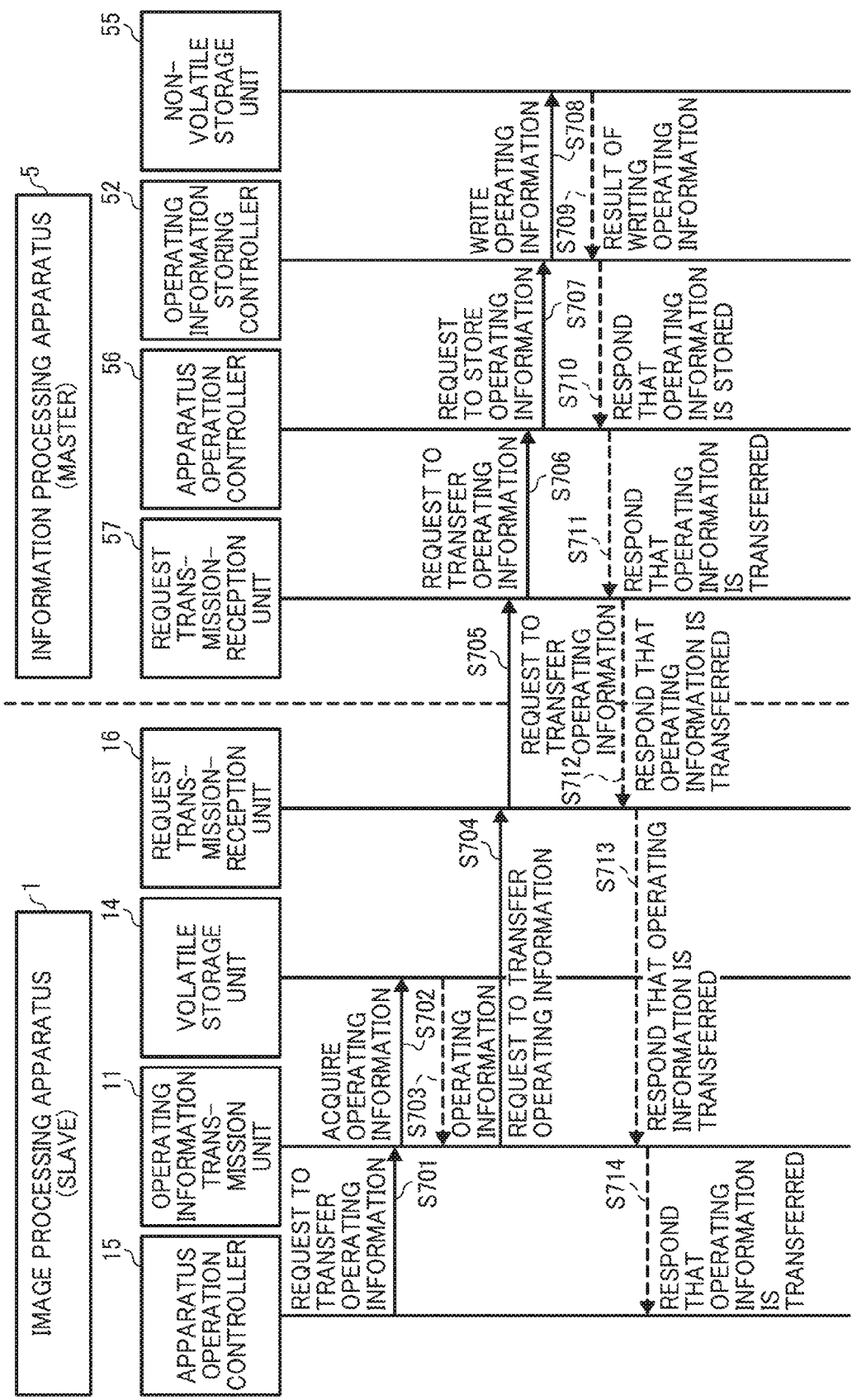
FIG. 7 is a sequence chart illustrating an operation that the image processing apparatus 1 (slave) transfers its operating information to the information processing apparatus 5 (master).

FIG. 7 is a sequence chart illustrating an operation that the image processing apparatus 1 (slave) transfers its operating information to the information processing apparatus 5 (master).

The apparatus operation controller 15 in the image processing apparatus 1 requests the operating information transmission unit 11 to transfer the operating information. After receiving the request to transfer the operating information, the operating information transmission unit 11 reads the operating information from the volatile storage unit 14 and requests the request transmission-reception unit 16 to transfer the operating information. The request transmission-reception unit 16 transfers the request to transfer the operating information to the information processing apparatus 5.

In the information processing apparatus 5, after receiving the request to transfer the operating information, the request transmission-reception unit 57 requests the apparatus operation controller 56 to transfer the operating information, and the apparatus operation controller 56 requests the operating information storing controller 52 to store the operating information.

Subsequently, the operating information storing controller 52 writes the operating information received from the image processing apparatus 1 in the nonvolatile storage unit 55. After finishing writing the operating information, the operating information storing controller 52 receives a result of writing the operating information from the nonvolatile storage unit 55.

After that, the operating information storing controller 52 transfers a response of storing the operating information to the apparatus operation controller 56. Subsequently, the apparatus operation controller 56 transfers the response of transferring the operating information to the request transmission-reception unit 57 and requests to transfer the response of transferring the operating information to the image processing apparatus 1.

In the image processing apparatus 1, after receiving the response of transferring the operating information, the request transmission-reception unit 16 transfers the response of transferring the operating information to the apparatus operation controller 15 via the operating information transmission unit 11.

As described above, regarding the operation that the operating information of the image processing apparatus 1 is transferred to the information processing apparatus 5 and written in the nonvolatile storage unit 55 in the information processing apparatus 5, it is possible to perform the operation on regular basis or at specified data and time in accordance with a configuration of the image processing apparatus 1. In addition, it is possible to set a threshold value of free space in the volatile storage unit 14 in the image processing apparatus 1 and change a way of transferring the operating information depending on whether or not the free space in the volatile storage unit 14 is equal to or more than the threshold value.

The similar operation is performed between the information processing apparatus 5 and the other image processing apparatuses 2 and 3 as the slaves respectively.

FIGS. 8A and 8B are sequence charts illustrating an operation that the information processing apparatus 5 (master) distributes a rule of storing operating information to the image processing apparatus 1 (slave).

The apparatus operation controller 56 in the information processing apparatus 5 requests the operating information determination unit 54 to analyze the operating information. As a result, the operating information determination unit 54 reads the operating information stored in the nonvolatile storing unit 55 and analyzes the operating information. Subsequently, the rule of storing operating information is updated depending on the analysis result, and the operating information determination unit 54 requests the rule of storing operating information transmission unit 53 to transfer the rule of storing operating information. Consequently, the rule of storing operating information transmission unit 53 requests the request transmission-reception unit 47 to transfer a request to transfer the rule of storing operating information to the image processing apparatus.

After the request transmission-reception unit 16 in the image processing apparatus 1 receives the request to transfer the rule of storing operating information, the request transmission-reception unit 16 requests the apparatus operation controller 15 to transfer the rule of storing operating information. Subsequently, the apparatus operation controller 15 requests the operating information storing controller 12 to store the rule of storing operating information. As a result, the operating information storing controller 12 writes the new rule of storing operating information in the volatile storage unit 14.

After finishing writing the rule of storing operating information in the image processing apparatus 1, the operating information storing controller 12 receives a result of writing the rule of storing operating information from the volatile storage unit 14, and the result of writing the rule of storing operating information is transferred to the apparatus operation controller 15. Subsequently, the apparatus operation controller 15 transfers the response of storing the rule of storing operating information to the request transmission-reception unit 16 and requests to transfer the response of storing the rule of storing operating information to the information processing apparatus 5.

After the request transmission-reception unit 57 in the information processing apparatus 5 receives the response, the response of transferring the rule of storing operating information is transferred to the operating information determination unit 54 via the rule of storing operating information transmission unit 53.

The similar operation is performed between the information processing apparatus 5 (master) and the image processing apparatuses 2 and 3 (slaves) respectively.

When the system starts up for the first time, the information processing apparatus 5 as the master distributes the rule of storing operating information to all image processing apparatuses 1 to 3 as the slaves.

It is possible to distribute the rule of storing operating information at a predetermined interval or specified date/time. In addition, it is possible to update the rule of storing to a latest status by exchanging the rule of storing between the master and the slaves regularly.

Figure 9:
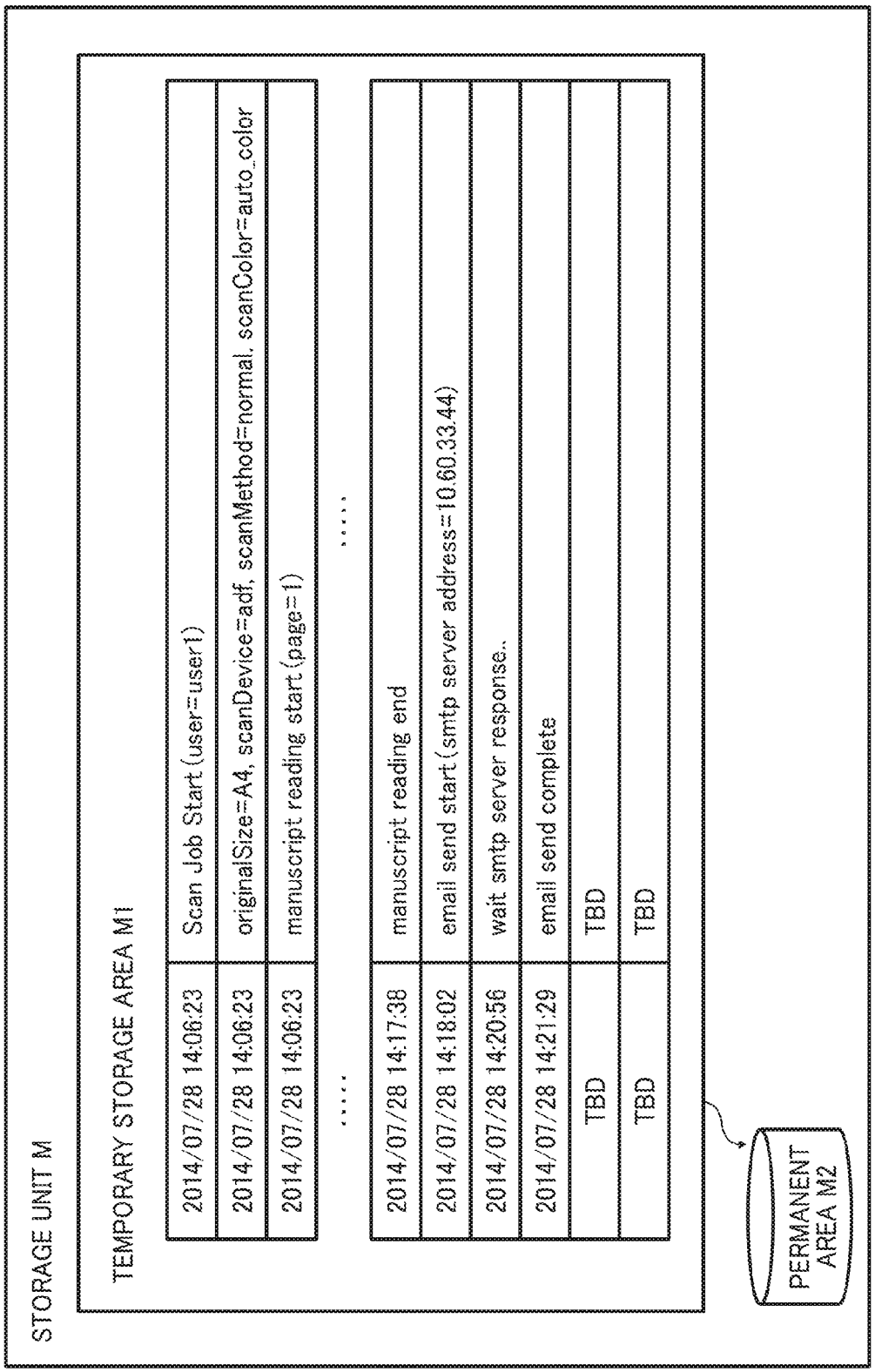
FIG. 9 is a diagram illustrating a data configuration of the operating information as an embodiment of the present invention.

FIG. 9 is a diagram illustrating a data configuration of the operating information in this embodiment.

Both the master and the slave can store the operating information in the internal storage device, and the information processing apparatus 5 as the master stores the operating information in FIG. 9.

A storage unit M is divided into a volatile temporary storage area M1 and a nonvolatile permanent area M2. After data is written in the temporary storage area M1, the data is stored in the permanent area M2 later.

The temporary storage area M1 corresponds to the RAM 507 in FIG. 2, and the permanent area M2 corresponds to the nonvolatile storage unit 55 in FIG. 3 and the HDD 509 in FIG. 2.

The image processing apparatuses 1 to 3 as the slaves only include the temporary storage area M1 as the storage unit M. In this case, the temporary storage area M1 corresponds to the volatile storage unit 14 in FIG. 3 and the RAM 107 in FIG. 2.

In the temporary storage area M1 in FIG. 9, operating information such as "start scan job", "scanning size", "start reading document", "finish reading document", "start transferring e-mail", "wait for response from SMTP server", and "finish transferring e-mail" etc. is recorded along with its generated date/time.

FIG. 10 is a diagram illustrating a data configuration of the rule of storing operating information in this embodiment.

The rule of storing operating information consists of a type of service call, a description of service call, priority, and date/time when the priority is updated. A type number of service call described above (e.g., SC899 etc.) is recorded in the operating information in FIG. 9.

Types of service call in FIG. 10 are "malfunction of software", "malfunction of communication between the controller and the control panel", "malfunction of transaction per minute (TPM)", "error of data in address book", "kernel panic", "application function cannot be selected", and "error in accessing the HDD" etc.

When the system starts service, default priority is configured to the type of service call. In some cases, the priority is changed depending on a status of system operation.

Regarding a level of the priority as a threshold value, an apparatus administrator can configure whether or not it is required to store information on the type of service call. For example, it is possible to configure that the type of service call whose priority is equal to or more than 4 is acquired and type of service call whose priority is equal to or less than 3 is not acquired.

In addition, it is possible to configure whether or not it is required to store depending on each level of the priority. For example, it is possible to configure for each level of the priority such as it is stored in case of level 5, it is stored in case of levels 4 and 3, it is stored in case of level 2, and it is stored in case of level 1 etc.

Here, a specific case of analyzing the operating information and subsequent operation by the operating information determination unit 54 in the information processing apparatus 5 (master) is described below with reference to a flowchart in FIG. 11. The operation is performed by the CPU 505 in the information processing apparatus 5 as the master.

As described above with reference to FIGS. 6A and 6B, the information processing apparatus 5 as the master acquires the operating information from the volatile storing unit 14 in the multiple information processing apparatuses 1 to 3 as the slaves respectively and stores the respective operating information writing in the nonvolatile storage unit 55.

Figure 11:
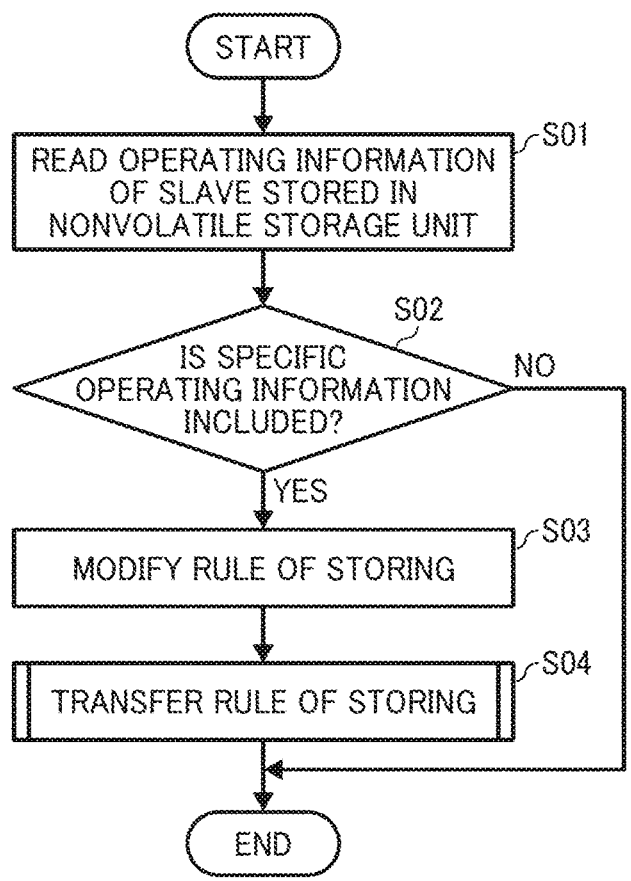
FIG. 11 is a diagram illustrating an operation of analyzing the operating information and a subsequent operation by the information processing apparatus 5 (master).

In this case, after receiving the request to analyze the operating information from the apparatus operation controller 56 in FIG. 8A, the CPU 505 in the information processing apparatus 5 as the master starts the operation in FIG. 11 as a function of the operating information determination unit 54.

First, in S01, the CPU 505 reads one of the operating information of the image processing apparatuses 1 to 3 as the slaves stored in the nonvolatile storage unit 55 as described above, i.e., a series of operating information as shown in FIG. 9.

Next, in S02, it is determined whether or not specific operating information is included in the read series of operating information. The specific operating information indicates that a serious malfunction or error occurs in the slave. For example, Numbers 1 to 3 shown below among the types of service call in FIG. 10 are specified as the specific operating information.

No. 1: SC899 malfunction of software
No. 2: SC672 malfunction of communication between the controller and the control panel
No. 3: SC878 malfunction of TPM In S02, the CPU 505 detects the type numbers of service call described above by searching for the string etc. and determines whether or not the specific operating information is included. As a result, if it is determined that the specific operating information is included, the rule of storing is modified so that the higher priority of storing for the specific operating information is set in S03. This operation corresponds to a command to store the specific operating information preferentially.

After that, in S04, the CPU 505 requests the rule of storing operating information transmission unit 53 to transfer the rule of storing operating information as shown in FIG. 8A to transfer the modified rule of storing to each of the image processing apparatuses 1 to 3 as the slaves respectively, subsequent operation is performed, and the operation ends.

If the CPU 505 determines that the specific operating information is not included in S02, the operation ends as is.

The operation in steps S01 to S04 is performed on the series of operating information stored in the nonvolatile storage unit 55 for each of the image processing apparatuses 1 to 3 respectively sequentially.

As a result, if the specific operating information is included in any one of the operating information of the image processing apparatus (slave), the rule of storing corresponding to the command to store the specific operating information preferentially is transferred to each of the image processing apparatuses 1 to 3 by using the request transmission-reception unit 57 (a first transmission unit).

In the image processing apparatuses 1 to 3 as the slaves, the operating information storing controller 12 (a second storing controller) performs an operation based on the command of the rule of storing transferred by the request transmission-reception unit 57 (the first transmission unit) in the information processing apparatus 5. That is, if the specific operating information commanded in accordance with the operation of the image processing apparatus itself is generated, the specific operating information is stored in the volatile storage unit 14 until the specific operating information is transferred to the information processing apparatus 5 by the request transmission-reception unit 16 (the second transmission unit).

If a serious malfunction or error occurs in at least any of the image processing apparatuses as the slaves in the network, it is highly possible that the same malfunction or error occurs in other slaves with similar status of use or environment for usage. However, since the storage size of the volatile storage unit in the slaves is small, it is possible that the malfunction or error is not grasped appropriately.

In this embodiment, as described above, if the specific operating information (indicating that the serious malfunction or error occurs) is included in the operating information of any one of the slaves acquired and stored in the master, all slaves are requested to store the specific operating information if the specific operating information is generated. Therefore, it is possible to check whether or not the same serious malfunction or error etc. occurs in other slaves appropriately.

Figure 12:
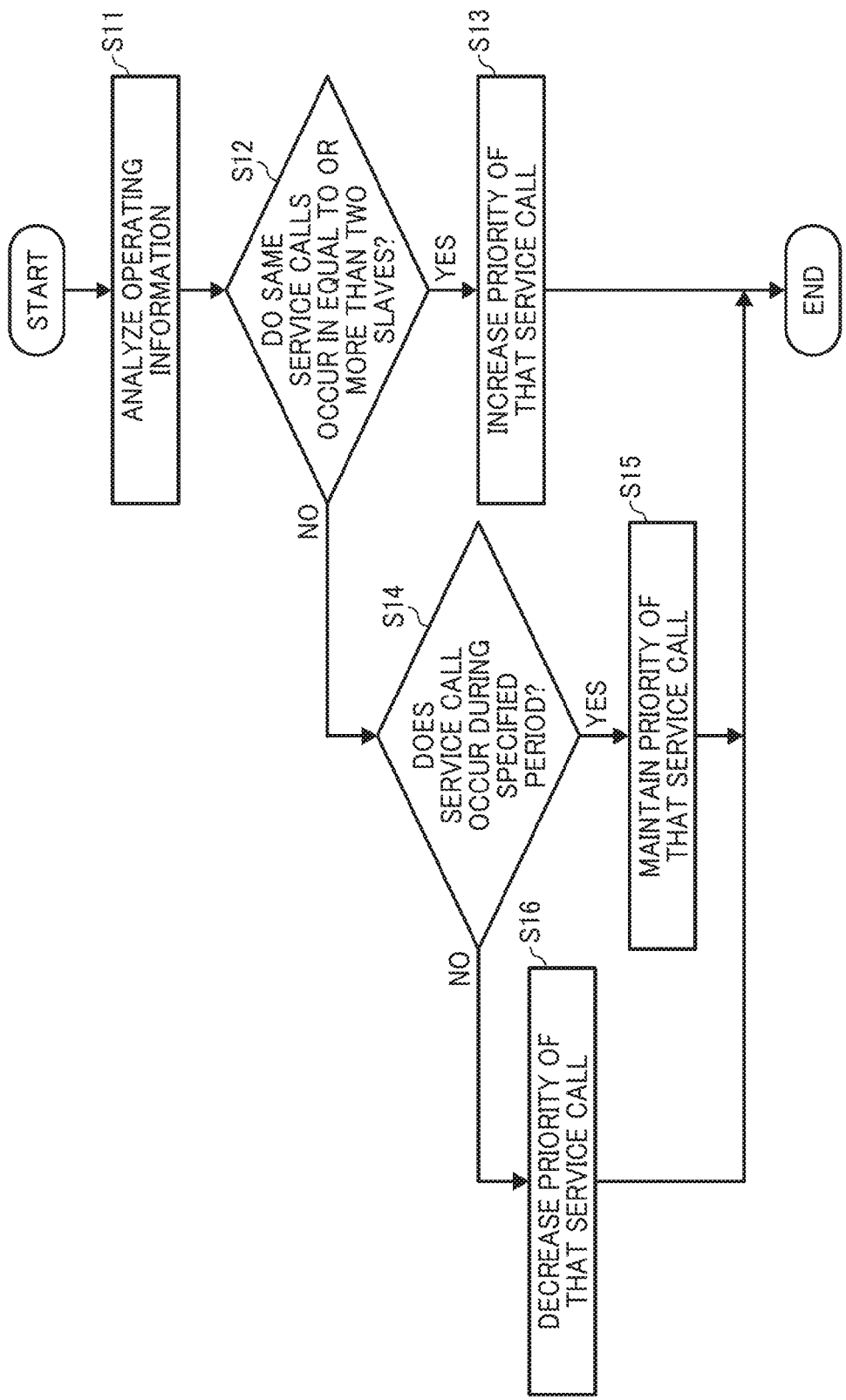
FIG. 12 is a diagram illustrating an operation that modifies priority by the analysis of the operating information by the information processing apparatus 5 (master).

FIG. 12 is a diagram illustrating an operation that modifies priority by the analysis of the operating information by the information processing apparatus 5 (master). The operation is also performed by the CPU 505 in the information processing apparatus 5 as the master.

As described above, the information processing apparatus 5 as the master stores the operating information of the multiple image processing apparatuses 1 to 3 as the slaves in the nonvolatile storage unit 55.

After the CPU 505 starts the operation in FIG. 12, first, in S11, the operating information of the slave stored in the nonvolatile storage unit 55 is read, and the type numbers of service call are analyzed by searching for a string etc. Subsequently, in S12, it is determined whether or not the same service call occurs in equal to or more than two slaves. In case of YES in S12, the priority of the target service call is increased in S13, and the operation ends.

If it is determined that the same service call does not occur in equal to or more than two slaves in S12, it is determined whether or not the service call occurs within a specified period of time in S14.

As a result, if the service call occurs during the specified period of time, the priority of the target service call is maintained in S15, and the operation ends. In case of NO in S14, the priority of the target service call is decreased in S16, and the operation ends.

In the above description, the priority is increased if the same service call occurs in equal to or more than two slaves. However, the number of slaves and the specified period of time as criterion of judgment can be configured arbitrarily in the master.

As described above, the modification of the priority corresponds to the modification of the rule of storing.

If the same service call occurs in equal to or more than two slaves and the priority is increased, just like the case that the specific operating information is included as described above, it is possible to transfer the rule of storing corresponding to a command to store the operating information preferentially to all image processing apparatuses 1 to 3 (all slaves). As a result, in the image processing apparatuses 1 to 3 as the slaves, if the operating information including the same service call described above occurs, the operating information is stored in the volatile storage unit 14 preferentially.

FIGS. 13A and 13B are sequence charts illustrating an operation that the image processing apparatus 1 (slave) modifies the rule of storing operating information in the information processing apparatus 5 (master).

The image processing apparatus 1 (slave) acquires and analyzes the operating information stored in the information processing apparatus 5 (master).

The apparatus operation controller 15 in the image processing apparatus 1 (slave) transfers a request to acquire the operating information to the request transmission-reception unit 16 via the operating information acquisition unit 13 to implement the operation. As a result, the request transmission-reception unit 16 transfers the request to acquire the operating information to the information processing apparatus 5 (master).

In the information processing apparatus 5, after receiving the request to acquire the operating information, the request transmission-reception unit 57 transfers the request to acquire the operating information to the operating information storing controller 52 via the apparatus operation controller 56.

As a result, the operating information storing controller 52 acquires the operating information stored in the nonvolatile storage unit 55. Subsequently, after receiving a result of reading from the nonvolatile storage unit 55, a response of acquiring the operating information is transferred to the request transmission-reception unit 57 via the apparatus operation controller 56. The request transmission-reception unit 57 transfers the response of acquiring the operating information to the image processing apparatus 1 (slave).

In the image processing apparatus 1, after receiving the response of acquiring the operating information, the request transmission-reception unit 16 transfers the response of acquiring the operating information to the apparatus operation controller 15 via the operating information acquisition unit 13. After that, the apparatus operation controller 15 requests the operating information storing controller 12 to modify the rule of storing operating information.

As a result, the operating information storing controller 12 in the image processing apparatus 1 modifies the rule of storing operating information using analysis of the operating information (described later) based on the operating information acquired from the information processing apparatus 5 and the rule of storing operating information stored in the image processing apparatus 1 to generate a new rule of storing operating information.

Its own operating information and the operating information from other apparatuses are to be analyzed. The only difference among them is a parameter in transferring/receiving the operating information, and the flow of the operation that modifies the operating information itself is the same.

Next, the operating information storing controller 12 writes the generated new rule of storing operating information in the volatile storage unit 14. After receiving a result of writing the rule of storing operating information from the volatile storage unit 14, the rule of storing operating information is transferred to the apparatus operation controller 15.

After that, the apparatus operation controller 15 transfers a request to modify the rule of storing operating information to the request transmission-reception unit 16. Subsequently, the request transmission-reception unit 16 transfers the request to modify the rule of storing operating information to the information processing apparatus 5 (master).

After the request transmission-reception unit 57 in the information processing apparatus 5 receives the request, the request to modify the rule of storing operating information is transferred to the operating information storing controller 52 via the apparatus operation controller 56. As a result, the operating information storing controller 52 writes the rule of storing operating information in the nonvolatile storage unit 55, and a result of writing the rule of storing operating information is received from the nonvolatile storage unit 55.

As described above, the rule of storing operating information modified by the image processing apparatus 1 is transferred to the information processing apparatus 5 (master) and written in the nonvolatile storage unit 55 in the information processing apparatus 5 (master).

The similar operation is performed between the information processing apparatus 5 (master) and the image processing apparatuses 2 and 3 (slaves) respectively.

Figure 14:
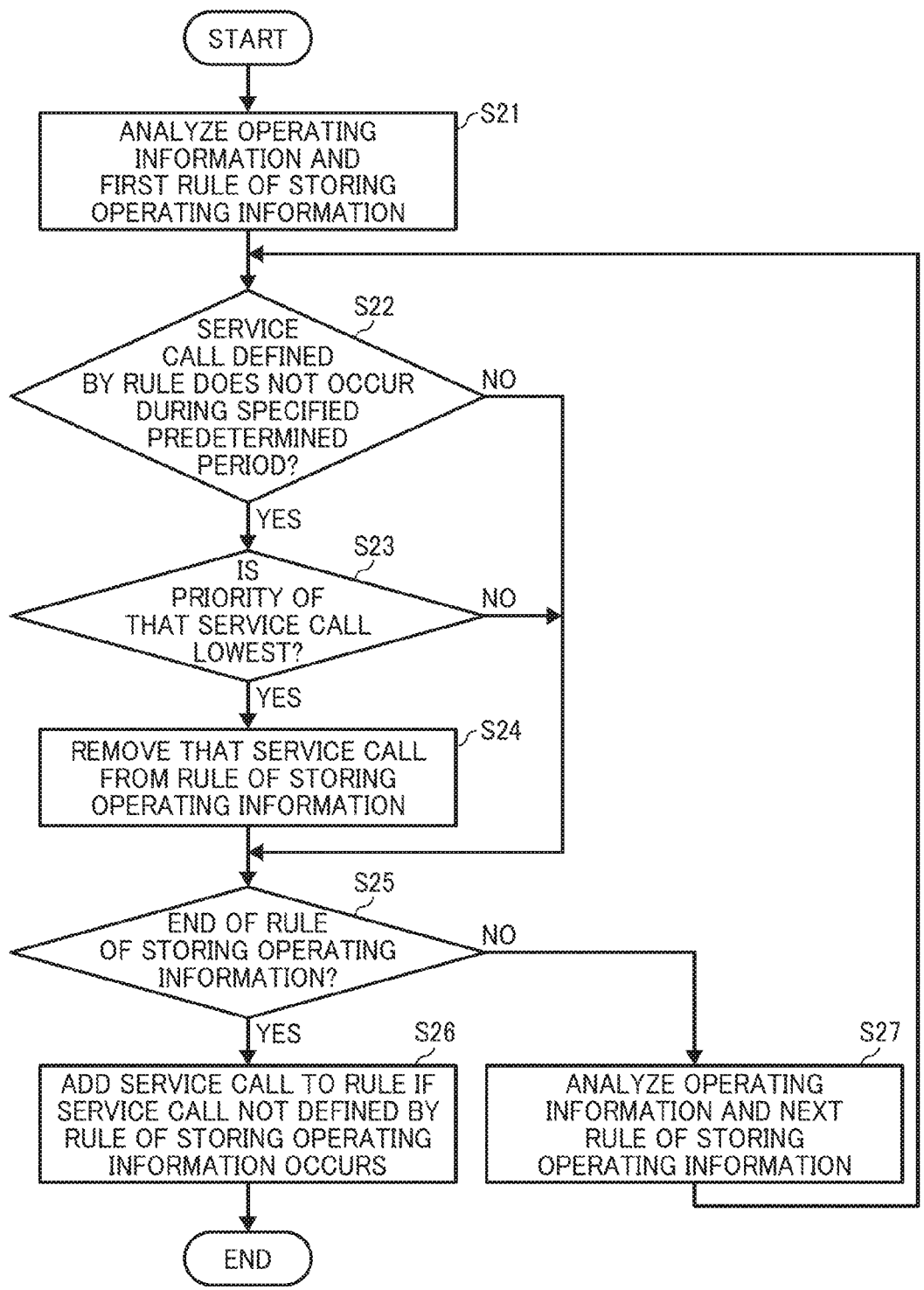
FIG. 14 is a flowchart illustrating an operation that the image processing apparatus 1 (slave) modifies the rule of storing operating information by analyzing the operating information and the rule of storing operating information.

FIG. 14 is a flowchart illustrating an operation that the image processing apparatus 1 (slave) modifies the rule of storing operating information by analyzing the operating information and the rule of storing operating information. The operation is performed by the CPU 105 in the image processing apparatus 1 as the slave. The other image processing apparatuses 2 and 3 perform the similar operation.

After the CPU 105 starts the operation in FIG. 14, first, in S21, the operating information acquired from the information processing apparatus 5 (master) and the first rule of storing operating information stored in the image processing apparatus 1 itself (i.e., the No. 1 rule of storing operating information in FIG. 10) are analyzed, and the rule of storing operating information is reviewed in the following steps.

That is, the CPU 105 determines whether or not the service call defined in the rule of storing operating information occurs within the specified period of time in S22.

As a result, if the service call does not occur, it is determined whether or not the priority of the target service call is the lowest in S23. If so, the target service call is deleted from the rule of storing operating information in S24, and the step proceeds to S25.

If the CPU 105 determines that the service call defined in the rule occurs during the specified period of time in S22 of the CPU 105 determines that the priority of the target service call is not the lowest in S23, the step proceeds to S25 as is.

In S25, it is determined whether or not the rule of storing operating information analyzed this time is the end of the rule of storing operating information. If so, the step proceeds to S26. If the service call not defined in the rule of storing operating information occurs, the service call is added to the rule, and the operation ends.

In case on NO in S25, the CPU 105 analyzes the operating information acquired from the information processing apparatus 5 (master) and the next rule of storing operating information stored in the image processing apparatus 1 itself (i.e., the next No. 2 rule of storing operating information in FIG. 10), and the step goes back to S22.

Next, the CPU 105 repeats the operation from steps S22 to S25 and S27 until it is determined that the rule of storing operating information analyzed currently is the end of the rule of storing operating information in S25.

The CPU 105 can only use its own operating information acquired from the master for the determination. Otherwise, it is possible to perform the determination by using its own operating information and the operating information acquired from other apparatuses.

In addition, it is possible to perform both the operation that modifies the priority by analyzing the operating information shown in FIG. 12 and the operation that modifies the rule of storing operating information by analyzing the operating information and the rule of storing operating information shown in FIG. 14. Otherwise, it is possible to modify the rule of storing operating information by applying the operation in FIG. 14 only.

It is possible to configure the operation that modifies the rule of storing operating information by configuring the settings in the image processing apparatus as the slave. Similarly, the determination period can also be configured in the image processing apparatus.

By performing the determination operation in FIG. 14, it is possible to remove the service call defined in the rule of storing operating information whose priority is low. In addition, if the service call not defined in the rule of storing operating information occurs during the specified period of time, the service call is added to the rule of storing operating information newly. In that case, the default value of the priority becomes the lowest, and it is possible to configure the setting in the image processing apparatus as the slave.

Even in the case of a service call newly added, a higher priority is set to a service call that occurs in multiple apparatuses exceptionally.

Figure 15:
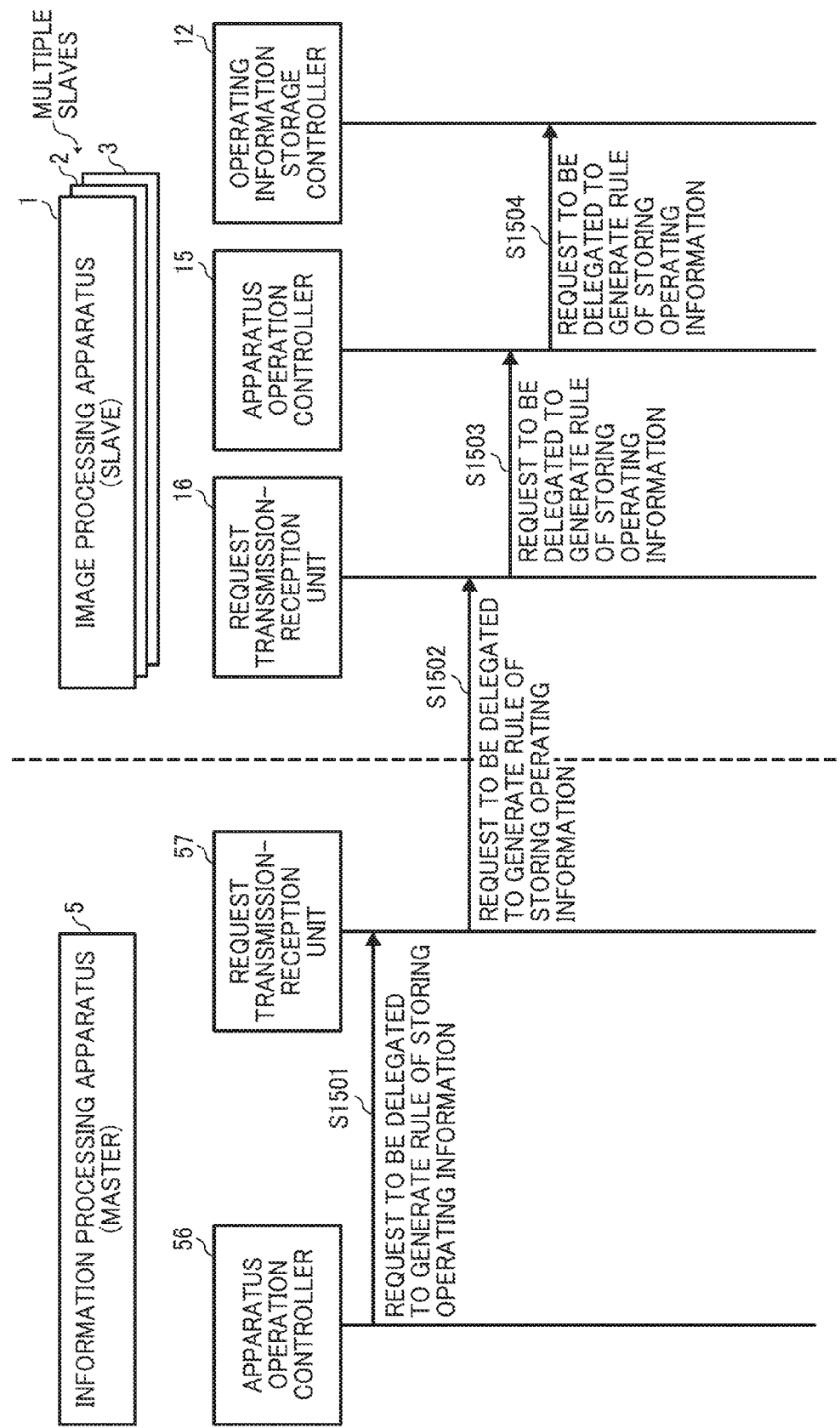
FIG. 15 is a sequence chart illustrating an operation that the information processing apparatus 5 (master) delegates an obligation of generating the rule of storing operating information to the image processing apparatuses 1 to 3 (slaves).

FIG. 15 is a sequence chart illustrating an operation that the information processing apparatus 5 (master) delegates an obligation of generating the rule of storing operating information to the image processing apparatuses 1 to 3 (slaves).

In this system, depending on a system configuration and system status, the obligation of generating the rule of storing operating information can be delegated between the master and the slave.

First, a case that the obligation of generating the rule of storing operating information can be delegated from the master to the slave is described below. In this case, the number of slaves that consist of the system increases so much, and the master cannot generate the rule of storing operating information for all slaves.

In the information processing apparatus 5 (master), the apparatus operation controller 56 requests the request transmission-reception unit 57 to delegate the obligation of generating the rule of storing operating information. Accordingly, the request transmission-reception unit 57 transfers the request to delegate the obligation of generating the rule of storing operating information to all image processing apparatuses (slaves) 1 to 3 that consist of the system.

In all of the image processing apparatuses 1 to 3 (slaves), the request transmission-reception unit 16 receives the request, and the apparatus operation controller 15 is requested to delegate the obligation of generating the rule of storing operating information respectively. Subsequently, each apparatus operation controller 15 requests the operating information storing controller 12 to delegate the obligation of generating the rule of storing operating information. As described above, in the image processing apparatuses 1 to 3 (slaves), after it is requested to delegate the obligation, the operation of modifying the rule of storing operating information from the slave to the master described above with reference to FIGS. 13A and 13B is performed. The information processing apparatus 5 (master) receives the rule of storing operating information generated by the image processing apparatuses 1 to 3 (slaves) and acquires the operating information of the image processing apparatuses 1 to 3 (slaves) in accordance with the rule.

Next, a case that the obligation of generating the rule of storing operating information is delegated from the slave to the master is described below. In this case, the number of masters that consist of the system increases, and the masters can share generating the rule of storing operating information for slaves.

While a sequence chart in this case is not shown in figures, the image processing apparatuses 1 to 3 (slaves) requests the information processing apparatus 5 (master) to delegate the obligation of generating the rule of storing operating information. In the information processing apparatus 5, after receiving the request for delegation, the operation of distributing the rule of storing operating information from the master to the slave described above is performed. After each of the image processing apparatuses 1 to 3 (slaves) receives the rule of storing operating information generated by the information processing apparatus 5 (master), the operating information of each of the image processing apparatuses 1 to 3 is transferred to the information processing apparatus 5.

In the case described above, the operation of delegating obligation is performed depending on the number of masters and slaves. However, the condition that the operation of delegating obligation is performed is not limited to the number of apparatuses.

For example, if the master of the slave breaks down, it is possible that the dead apparatus delegates the obligation to the alive apparatus.

Otherwise, if a free space of the storage area in the master becomes short, the master requests the slave to delegate the obligation. This is because the master generates the rule that surely stores operating information with high priority only regardless of the shortage of the storage area in the master and distributes the rule to the slave.

FIG. 16 is a diagram illustrating another system configuration similar to FIG. 1.

The only point that the system configuration in FIG. 16 is different from the system configuration in FIG. 1 is that an image processing apparatus 6 such as the MFP is used as the master. The image processing apparatus 6 further includes a HDD as the nonvolatile storage unit in addition to the hardware configuration similar to the image processing apparatuses 1 to 3 in FIG. 2. The image processing apparatus 6 including the nonvolatile storage unit has capabilities same as the information processing apparatus as the master in the embodiments described above and performs those operations.

The system configurations are not limited to the cases described above, and it is possible that various information processing apparatuses such as the PCs and servers and various image processing apparatuses such as the image forming apparatus etc. are connected to the network as the masters and slaves as many as possible in the system. It is possible to connect the multiple masters, and it is possible any apparatus described above is regarded as the master or slave. It is possible to implement functions described above in any apparatus. It is possible that the master implements functions of the slaves. Otherwise, it is possible to construct the system without distinguishing the master from the slave clearly.

It is possible that the master such as the information processing apparatus includes the volatile storage unit instead of including the nonvolatile storage unit. In that case, the first operating information storing controller searches for the information processing apparatus including the nonvolatile storage unit connected to the master via the network. Accordingly, it is possible to store the operating information stored in its own volatile storage unit in the nonvolatile storage unit included in the information processing apparatus.

As described above, since it is possible that the information processing apparatus that does not include the nonvolatile storage unit can use the nonvolatile storage area included in the other information processing apparatus, it is possible to reduce cost of installing the system in a lump sum.

It is preferable that the second operating information storing controller in the slave (the operating information storing controller 12 in FIG. 3) prevents operating information with high priority from being overwritten even if not all operating information stored in the volatile storage unit 14 based on the information on rule of storing operating information is transferred to the nonvolatile storage unit 55 in the master.

Accordingly, it is possible to prevent operating information recorded in malfunction in the information processing apparatus 5 as the master from being erased, enabling to recover the information processing apparatus quickly. As a result, it is possible to reduce downtime.

If the information processing apparatus does not include the nonvolatile storage unit 55, it is possible that the operating information storing controller 52 in the information processing apparatus 5 (master) searches for an apparatus with light load among the information processing apparatuses including the nonvolatile storage unit connected to the network to instruct the information processing apparatus to store the operating information stored in its own temporary storage area for operating information in the nonvolatile storage unit.

Accordingly, it is possible to distribute load of whole information processing system, enhancing efficiency of the system and preventing operating information from being lost.

Based on the information acquired by analyzing the operating information stored in the nonvolatile storage unit 55, the operating information determination unit 45 in the information processing apparatus 5 (master) instructs the rule of storing operating information transmission unit 53 to distribute the rule of storing operating information to multiple slaves.

Accordingly, it is possible to apply a unified rule of storing operating information in the information processing system, and it is possible to discover a problem that occurs in the system earlier and prevent malfunction from occurring.

The operating information acquisition unit 51 in the information processing apparatus 5 (master) can acquire the operating information stored in each of the image processing apparatuses 1 to 3 (slaves) for a predetermined period of time or at a specified date/time in accordance with the configuration in the master.

Accordingly, the master can acquire and store the operating information of the slave regularly, and it is possible to keep network load light and prevent the operating information in the slaves from being lost.

The operating information transmission unit 11 in the image processing apparatuses 1 to 3 (slaves) can transfer the operating information stored in each of the slaves to the master for a predetermined period of time or at a specified date/time in accordance with the configuration in the slave.

Accordingly, each of the slaves can transfer the operating information to the master depending on its own configuration, and it is possible to distribute the network load and master load, enhancing the system efficiency.

As a method of distributing the rule of storing operating information, the rule of storing operating information transmission unit 53 in the information processing apparatus 5 (master) can transfer a list including information on a list of service calls to each of the image processing apparatuses 1 to 3 (slaves).

Accordingly, it is possible to update the latest rule of storing operating information in the multiple slaves in a lump sum.

Otherwise, as a method of distributing the rule of storing operating information, it is possible to specify information on a specific service call and transfer the information to each of the image processing apparatuses 1 to 3 (slaves).

In this case, it is possible to notify the multiple slaves of the rule of storing operating information with high urgency only and store the operating information immediately.

Otherwise, as a method of distributing the rule of storing operating information, it is possible to calculate difference information between the rules of storing operating information stored in each slave and transfer the difference to the slave.

In this case, it is possible to keep network load light and update the latest rule of storing operating information in the multiple slaves in a lump sum.

The operating information storing controller 12 in the image processing apparatuses 1 to 3 (slaves) can transfer the rule of storing operating information generated with reference to its own operating information stored in the information processing apparatus 5 (master) to the master. Accordingly, it is possible to reduce load of generating the rule of storing operating information in the master.

In addition, with reference to its own operating information stored in the master, if it is considered that the slave operates stably over a predetermined period of time, it is possible to modify the rule of storing operating information to reduce amount of transferred operating information of the number of times transferring operating information.

Accordingly, it is possible to reduce load of the storage area in the master and network load.

Otherwise, if a particular malfunction occurs often, it is possible to modify the rule of storing operating information so that the operating information with the malfunction is stored in the master preferentially.

Accordingly, it is possible to prevent the operating information including the factor that disrupts the stable operation of the system from being lost.

It is possible to delegate the obligation of generating the rule of storing operating information between the information processing apparatus 5 (master) and the image processing apparatuses 1 to 3 (slaves).

It is possible to delegate the obligation of generating the rule of storing operating information depending on the number of masters, if the master or other apparatuses in the system become dead, or in accordance with the remaining size of free space in the storage area in the master etc.

Accordingly, it is possible to enhance efficiency of whole system by distributing load in the master, and it is possible to keep the whole system operating and prevent operating information from being lost even if some apparatuses in the system become dead. Alternatively, it is possible to keep the system operating stably considering the storage area in the master and prevent operating information from being lost.

Numerous additional modifications and variations are possible in light of the above teachings. It is therefore to be understood that within the scope of the appended claims, the disclosure of the present invention may be practiced otherwise than as specifically described herein.

For example, elements and/or features of different illustrative embodiments may be combined with each other and/or substituted for each other within the scope of this disclosure and appended claims.

As can be appreciated by those skilled in the computer arts, this invention may be implemented as convenient using a conventional general-purpose digital computer programmed according to the teachings of the present specification. Appropriate software coding can readily be prepared by skilled programmers based on the teachings of the present disclosure, as will be apparent to those skilled in the software arts. The present invention may also be implemented by the preparation of application-specific integrated circuits or by interconnecting an appropriate network of conventional component circuits, as will be readily apparent to those skilled in the relevant art.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

As described above, the present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, hard disk, CD ROM, magnetic tape device or solid state memory device.

What is claimed is:

1. An operating information storing system, comprising:
a master apparatus; and
a plurality of slave apparatuses;
wherein the master apparatus includes,
a first nonvolatile memory;
a first processor configured to:
exchange information between the master apparatus and at least one of the plurality of slave apparatuses
acquire operating information generated by each of the plurality of slave apparatuses in accordance with operation of each of the slave apparatuses;
store the acquired operating information in the first nonvolatile memory; and
determine whether at least one operating information among the acquired operating information indicates specific operating information; and
a first transmitter configured to transfer a rule of storing operating information to store the specific operating information to each of the plurality of slave apparatuses if the first processor determines that the operating information indicates the specific operating information; and
each of the plurality slave apparatuses includes:
a second volatile memory;
a second processor configured to store operating information generated in accordance with operation of the slave apparatus itself in the second volatile memory sequentially; and
a second transmitter configured to transfer the operating information stored in the second volatile memory to the master apparatus, and
the second processor is further configured to stores the specific operating information in the second volatile memory until the second transmitter transfers the generated specific operating information based on the rule transferred by the first transmitter if the specific operating information is generated in accordance with the operation of the slave apparatus, and prevent operating information with high priority from being overwritten even if all operating information stored in the second volatile memory is not transferred to the first nonvolatile memory based on the rule transferred by the first transmitter.

2. The operating information storing system according to claim 1, wherein
the master apparatus includes a first volatile memory; and
the first processor is further configured to
search for a second master apparatus connected to the master apparatus via a network, the second master apparatus including nonvolatile memory, and
instructs the second master apparatus to store the operating information, stored in the first volatile memory, in the nonvolatile memory in the second master apparatus.

3. The operating information storing system according to claim 1, wherein the first processor is further configured to instructs the first transmitter to distribute the rule of storing operating information to each of the plurality of slave apparatuses based on information acquired by analyzing the operating information stored in the first nonvolatile memory.

4. The operating information storing system according to claim 3, wherein the first transmitter is configured to transfers a list including information on a list of service calls to each of the plurality of slave apparatuses as a method of distributing the rule of storing operating information.

5. The operating information storing system according to claim 3, wherein the first transmitter is configured to transfer information specifying a specific service call to each of the plurality of slave apparatuses as a method of distributing the rule of storing operating information.

6. The operating information storing system according to claim 3, wherein the first transmitter is configured to transfers information based on a calculated difference between the rule of storing operating information stored in each of the plurality of slave apparatuses and the rule of storing operating information stored in the master apparatus, the transferring including transferring the information to each of the plurality of slave apparatuses as a method of distributing the rule of storing operating information.

7. The operating information storing system according to claim 1, wherein the first processor is further configured to acquires the operating information stored in each of the plurality of slave apparatuses for a desired period of time or at specified date/time in accordance with a configuration in the master apparatus.

8. The operating information storing system according to claim 1, wherein the second transmitter is configured to transfers the operating information stored in the slave apparatus for a desired period of time or at specified date/time in accordance with a configuration in the slave apparatus.

9. The operating information storing system according to claim 1, wherein the second processor in at least one of the plurality of slave apparatuses is configured to transfers the rule of storing operating information generated with reference to the operating information of the at least one slave apparatus stored in the master apparatus to the master apparatus.

10. The operating information storing system according to claim 1, wherein the second processor in at least one of the plurality of slave apparatuses is configured to modify the rule of storing operating information so that an amount of transferred operating information is reduced if it is considered that the slave apparatus operates stably for equal to or more than a desired period of time with reference to the operating information of the at least one slave apparatus stored in the master apparatus.

11. The operating information storing system according to claim 1, wherein the second processor in at least one of the plurality of slave apparatuses is configured to decreases a number of times of transferring operating information if it is considered that die slave apparatus operates stably for equal to or more than a desired period of time with reference to the operating information of the at least one slave apparatus stored in the master apparatus.

12. The operating information storing system according to claim 1, wherein the second processor in at least one of the plurality of slave apparatuses is configured to modify the rule of storing operating information so that operating information corresponding to a malfunction is stored preferentially if it is determined that the malfunction occurs frequently with reference to the operating information of the at least one slave apparatus stored in the master apparatus.

13. The operating information storing system according to claim 1, wherein the first processor is configured to delegate an obligation of generating the rule of storing operating information to at least one of the plurality of slave apparatuses.

14. The operating information storing system according to claim 1, wherein the second processor is configured to delegate an obligation of generating the rule of storing operating information to the master apparatus.

15. An operating information storing system including a plurality of apparatuses, the operating information storing system comprising:
    a nonvolatile memory;
    a first processor configured to:
        acquire operating information generated in accordance with operation of each of the plurality of apparatuses,
        store the acquired operating information in the nonvolatile memory, and
        determine whether or not at least one operating information among the acquired operating information indicates specific operating information;
    a first transmitter configured to transfer a rule to store the specific operating information to each of the plurality of apparatuses if the first processor determines that the operating information indicates the specific operating information;
    a volatile memory;
    a second processor configured to store operating information generated in accordance with operation of each apparatus of the plurality of apparatuses in the volatile memory sequentially; and
    a second transmitter configured to transfer the operating information stored in the volatile memory,
    the first processor is further configured to acquires the operating information transferred by the second transmitter,
    the second processor is further configured to stores the specific operating information in the volatile memory until the second transmitter transfers the generated specific operating information based on the rule transferred by the first transmitter if the specific operating information is generated, and
    prevent operating information with high priority from being overwritten even if all operating information stored in the volatile memory is not transferred to the nonvolatile memory based on the rule transferred by the first transmitter.

16. A method of storing operating information, performed by a master apparatus, the method comprising:
    acquiring operating information generated by each of a plurality of slave apparatuses in accordance with operation of each of the slave apparatuses;
    storing the acquired operating information in a nonvolatile memory;
    determining whether at least one operating information among the acquired operating information indicates specific operating information;
    transferring a request to store the specific operating information to each of the plurality of slave apparatuses if it is determined that the operating information indicates the specific operating information; and
    acquiring the operating information stored in each of the plurality of slave apparatuses for a desired period of time or at specified date/time in accordance with a configuration in the master apparatus.

17. A non-transitory computer-readable recording medium storing computer readable instructions that, when executed by one or more processors of a master apparatus, causes the one or more processors to implement a method of storing operating information comprising:
    acquiring operating information generated by each of a plurality of slave apparatus in accordance with operation of each of the plurality of slave apparatuses;

storing the acquired operating information in a nonvolatile memory;

determining whether at least one operating information among the acquired operating information indicates specific operating information;

transferring a request to store the specific operating information to each of the plurality of slave apparatuses, if it is determined that the operating information indicates the specific operating information; and acquiring the operating information stored in each of the plurality of slave apparatuses for a desired period of time or at specified date/time in accordance with a configuration in the master apparatus.

18. The method according to claim 16, further comprising:

distributing the rule of storing operating information by transferring a list including information on a list of service calls to each of the plurality of slave apparatuses.

19. The method according to claim 16, further comprising:

distributing the rule of storing operating information by transferring information specifying a specific service call to each of the plurality of slave apparatuses.

20. The non-transitory computer-readable recording medium according to claim 17, wherein the method further comprises:

distributing the rule of storing operating information by transferring a list including information on a list of service calls to each of the plurality of slave apparatuses.

* * * * *